(12) United States Patent
Koponen et al.

(10) Patent No.: US 9,843,476 B2
(45) Date of Patent: Dec. 12, 2017

(54) USING TRANSACTIONS TO MINIMIZE CHURN IN A DISTRIBUTED NETWORK CONTROL SYSTEM

(71) Applicant: Nicira, Inc., Palo Alto, CA (US)

(72) Inventors: Teemu Koponen, San Francisco, CA (US); W. Andrew Lambeth, San Mateo, CA (US); Pankaj Thakkar, Santa Clara, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 14/348,886

(22) PCT Filed: Apr. 18, 2013

(86) PCT No.: PCT/US2013/037232
§ 371 (c)(1),
(2) Date: Mar. 31, 2014

(87) PCT Pub. No.: WO2013/158918
PCT Pub. Date: Oct. 24, 2013

(65) Prior Publication Data
US 2014/0351432 A1 Nov. 27, 2014

Related U.S. Application Data

(60) Provisional application No. 61/635,056, filed on Apr. 18, 2012, provisional application No. 61/635,226, (Continued)

(51) Int. Cl.
*H04L 12/24* (2006.01)
*H04L 12/715* (2013.01)
(Continued)

(52) U.S. Cl.
CPC ...... *H04L 41/0803* (2013.01); *G06F 9/45558* (2013.01); *H04L 41/0654* (2013.01);
(Continued)

(58) Field of Classification Search
CPC ............. H04L 41/0803; H04L 41/0654; G06F 9/45558
See application file for complete search history.

(56) References Cited

U.S. PATENT DOCUMENTS

| 5,426,774 A | 6/1995 | Banerjee et al. |
| 5,504,921 A | 4/1996 | Dev et al. |

(Continued)

FOREIGN PATENT DOCUMENTS

| AU | 2012328699 | 4/2014 |
| AU | 2013249151 | 4/2014 |

(Continued)

OTHER PUBLICATIONS

International Search Report and Written Opinion of PCT/US2013/037231, Apr. 17, 2014 (mailing date), Nicira, Inc.
(Continued)

*Primary Examiner* — Arvin Eskandarnia
(74) *Attorney, Agent, or Firm* — Adeli LLP

(57) ABSTRACT

A particular network controller receives a first set of inputs from the first controller and a second set of inputs from the second controller. The particular controller then starts to compute a set of outputs using the first set of inputs. After a failure of the first controller, the particular controller receives a third set of inputs from the second controller. The third set of inputs and the first or second set of inputs makes up a group of inputs for being processed together and separately from another group of inputs. The particular controller then receives an indicator from the second controller, which indicates that all inputs of the group of inputs have arrived at the particular controller. After receiving the indicator and after computing the set of outputs completely, the particular controller sends the set of outputs to a fourth controller or to a managed forwarding element.

22 Claims, 11 Drawing Sheets

Related U.S. Application Data filed on Apr. 18, 2012, provisional application No. 61/647,516, filed on May 16, 2012, provisional application No. 61/684,693, filed on Aug. 17, 2012.

(51) Int. Cl.
   *H04L 12/721* (2013.01)
   *H04L 12/26* (2006.01)
   *G06F 9/455* (2006.01)
   *H04L 12/931* (2013.01)
   *H04L 12/751* (2013.01)

(52) U.S. Cl.
   CPC ...... *H04L 41/0893* (2013.01); *H04L 43/0823* (2013.01); *H04L 45/64* (2013.01); *H04L 45/72* (2013.01); *G06F 2009/4557* (2013.01); *H04L 45/02* (2013.01); *H04L 49/70* (2013.01)

(56) References Cited

U.S. PATENT DOCUMENTS

| | | | |
|---|---|---|---|
| 5,550,816 A | 8/1996 | Hardwick et al. | |
| 5,729,685 A | 3/1998 | Chatwani et al. | |
| 5,751,967 A | 5/1998 | Raab et al. | |
| 5,796,936 A | 8/1998 | Watabe et al. | |
| 5,805,791 A | 9/1998 | Grossman et al. | |
| 6,104,699 A | 8/2000 | Holender et al. | |
| 6,219,699 B1 | 4/2001 | McCloghrie et al. | |
| 6,512,745 B1 | 1/2003 | Abe et al. | |
| 6,539,432 B1 | 3/2003 | Taguchi et al. | |
| 6,680,934 B1 | 1/2004 | Cain | |
| 6,768,740 B1 | 7/2004 | Perlman et al. | |
| 6,785,843 B1 | 8/2004 | McRae et al. | |
| 6,862,263 B1 | 3/2005 | Simmons | |
| 6,941,487 B1 | 9/2005 | Balakrishnan et al. | |
| 6,963,585 B1 | 11/2005 | Le Pennec et al. | |
| 6,999,454 B1 | 2/2006 | Crump | |
| 7,046,630 B2 | 5/2006 | Abe et al. | |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,286,490 B2 | 10/2007 | Saleh et al. | |
| 7,359,971 B2 | 4/2008 | Jorgensen | |
| 7,450,598 B2 | 11/2008 | Chen et al. | |
| 7,483,370 B1 | 1/2009 | Dayal et al. | |
| 7,606,260 B2 | 10/2009 | Oguchi et al. | |
| 7,627,692 B2 | 12/2009 | Pessi | |
| 7,649,851 B2 | 1/2010 | Takashige et al. | |
| 7,710,874 B2 | 5/2010 | Balakrishnan et al. | |
| 7,730,486 B2 | 6/2010 | Herington | |
| 7,792,987 B1 | 9/2010 | Vohra et al. | |
| 7,818,452 B2 | 10/2010 | Matthews et al. | |
| 7,826,482 B1 | 11/2010 | Minei et al. | |
| 7,885,276 B1 | 2/2011 | Lin | |
| 7,903,666 B1 | 3/2011 | Kumar et al. | |
| 7,929,424 B2 * | 4/2011 | Kochhar | H04J 3/0685 370/220 |
| 7,937,438 B1 | 5/2011 | Miller et al. | |
| 7,948,986 B1 | 5/2011 | Ghosh et al. | |
| 8,027,354 B1 | 9/2011 | Portolani et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,060,779 B2 | 11/2011 | Beardsley et al. | |
| 8,166,201 B2 | 4/2012 | Richardson et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,312,129 B1 | 11/2012 | Miller et al. | |
| 8,321,561 B2 | 11/2012 | Fujita et al. | |
| 8,422,359 B2 | 4/2013 | Nakajima | |
| 8,456,984 B2 | 6/2013 | Ranganathan et al. | |
| 8,504,718 B2 | 8/2013 | Wang et al. | |
| 8,621,058 B2 | 12/2013 | Eswaran et al. | |
| 8,644,188 B1 | 2/2014 | Brandwine et al. | |
| 8,958,298 B2 | 2/2015 | Zhang et al. | |
| 8,959,215 B2 | 2/2015 | Koponen et al. | |
| 9,007,903 B2 | 4/2015 | Koponen et al. | |
| 9,083,609 B2 | 7/2015 | Casado et al. | |
| 9,391,880 B2 | 7/2016 | Koide | |
| 2001/0044825 A1 * | 11/2001 | Barritz | G06F 17/30887 709/203 |
| 2003/0093481 A1 | 5/2003 | Mitchell et al. | |
| 2003/0233385 A1 | 12/2003 | Srinivasa et al. | |
| 2004/0044773 A1 | 3/2004 | Bayus et al. | |
| 2004/0047286 A1 * | 3/2004 | Larsen | H04L 1/22 370/216 |
| 2004/0073659 A1 | 4/2004 | Rajsic et al. | |
| 2004/0098505 A1 | 5/2004 | Clemmensen | |
| 2004/0101274 A1 * | 5/2004 | Foisy | H03M 13/3761 386/201 |
| 2004/0267897 A1 | 12/2004 | Hill et al. | |
| 2005/0018669 A1 | 1/2005 | Arndt et al. | |
| 2005/0038834 A1 | 2/2005 | Souder et al. | |
| 2005/0083953 A1 | 4/2005 | May | |
| 2005/0120160 A1 | 6/2005 | Plouffe et al. | |
| 2005/0228952 A1 | 10/2005 | Mayhew et al. | |
| 2006/0002370 A1 | 1/2006 | Rabie et al. | |
| 2006/0018253 A1 | 1/2006 | Windisch et al. | |
| 2006/0026225 A1 | 2/2006 | Canali et al. | |
| 2006/0092940 A1 | 5/2006 | Ansari et al. | |
| 2006/0092976 A1 | 5/2006 | Lakshman et al. | |
| 2006/0174087 A1 | 8/2006 | Hashimoto et al. | |
| 2006/0184937 A1 | 8/2006 | Abels et al. | |
| 2006/0193266 A1 | 8/2006 | Siddha et al. | |
| 2007/0005627 A1 | 1/2007 | Dodge | |
| 2007/0043860 A1 | 2/2007 | Pabari | |
| 2007/0156919 A1 | 7/2007 | Potti et al. | |
| 2007/0220358 A1 | 9/2007 | Goodill et al. | |
| 2007/0260721 A1 | 11/2007 | Bose et al. | |
| 2007/0297428 A1 | 12/2007 | Bose et al. | |
| 2008/0002579 A1 | 1/2008 | Lindholm et al. | |
| 2008/0034249 A1 | 2/2008 | Husain et al. | |
| 2008/0040467 A1 | 2/2008 | Mendiratta et al. | |
| 2008/0049621 A1 | 2/2008 | McGuire et al. | |
| 2008/0059556 A1 | 3/2008 | Greenspan et al. | |
| 2008/0071900 A1 | 3/2008 | Hecker et al. | |
| 2008/0086726 A1 | 4/2008 | Griffith et al. | |
| 2008/0133687 A1 | 6/2008 | Fok et al. | |
| 2008/0159301 A1 | 7/2008 | de Heer | |
| 2008/0165704 A1 | 7/2008 | Marchetti et al. | |
| 2009/0070501 A1 * | 3/2009 | Kobayashi | G06T 1/00 710/65 |
| 2009/0245793 A1 * | 10/2009 | Chiang | H04J 14/0227 398/79 |
| 2009/0276661 A1 | 11/2009 | Deguchi et al. | |
| 2009/0279549 A1 | 11/2009 | Ramanathan et al. | |
| 2010/0002722 A1 | 1/2010 | Porat et al. | |
| 2010/0058106 A1 | 3/2010 | Srinivasan et al. | |
| 2010/0162036 A1 | 6/2010 | Linden et al. | |
| 2010/0205479 A1 | 8/2010 | Akutsu et al. | |
| 2010/0257263 A1 | 10/2010 | Casado et al. | |
| 2011/0103259 A1 | 5/2011 | Aybay et al. | |
| 2011/0134931 A1 | 6/2011 | Merwe et al. | |
| 2011/0173490 A1 * | 7/2011 | Narayanaswamy | H04L 63/1408 714/4.11 |
| 2011/0261825 A1 | 10/2011 | Ichino | |
| 2011/0273988 A1 | 11/2011 | Tourrilhes et al. | |
| 2011/0305167 A1 | 12/2011 | Koide | |
| 2011/0317559 A1 | 12/2011 | Kern et al. | |
| 2011/0317701 A1 | 12/2011 | Yamato et al. | |
| 2012/0151550 A1 | 6/2012 | Zhang | |
| 2012/0158942 A1 | 6/2012 | Kalusivalingam et al. | |
| 2012/0185553 A1 | 7/2012 | Nelson | |
| 2013/0044752 A1 | 2/2013 | Koponen et al. | |
| 2013/0054761 A1 | 2/2013 | Kempf et al. | |
| 2013/0211549 A1 | 8/2013 | Thakkar et al. | |
| 2013/0212243 A1 | 8/2013 | Thakkar et al. | |
| 2013/0212244 A1 | 8/2013 | Koponen et al. | |
| 2013/0212245 A1 | 8/2013 | Koponen et al. | |
| 2013/0212246 A1 | 8/2013 | Koponen et al. | |
| 2013/0219037 A1 | 8/2013 | Thakkar et al. | |
| 2013/0332602 A1 | 12/2013 | Nakil et al. | |
| 2013/0332619 A1 | 12/2013 | Xie et al. | |

(56) References Cited

U.S. PATENT DOCUMENTS

| | | |
|---|---|---|
| 2014/0040466 A1 | 2/2014 | Yang |
| 2014/0189212 A1* | 7/2014 | Slaight ............... G06F 12/0866 711/103 |
| 2014/0247753 A1 | 9/2014 | Koponen et al. |
| 2014/0348161 A1 | 11/2014 | Koponen et al. |
| 2015/0009804 A1 | 1/2015 | Koponen et al. |
| 2015/0341205 A1 | 11/2015 | Invernizzi et al. |
| 2016/0119224 A1 | 4/2016 | Ramachandran et al. |
| 2016/0197774 A1 | 7/2016 | Koponen et al. |

FOREIGN PATENT DOCUMENTS

| | | |
|---|---|---|
| AU | 2013249154 | 4/2014 |
| AU | 2013249152 | 9/2014 |
| EP | 1443423 | 8/2004 |
| EP | 1653688 | 5/2006 |
| EP | 2748706 | 7/2014 |
| EP | 2748990 | 7/2014 |
| EP | 2748993 | 7/2014 |
| EP | 2748994 | 7/2014 |
| EP | 2838244 A2 | 2/2017 |
| GB | 2485866 | 5/2012 |
| JP | 09-266493 | 10/1997 |
| JP | 2009-159636 | 7/2009 |
| WO | 2009001845 A1 | 12/2008 |
| WO | WO 2009/042919 | 4/2009 |
| WO | 2011080870 A1 | 7/2011 |
| WO | WO 2013/063332 | 5/2013 |
| WO | WO 2013/158917 | 10/2013 |
| WO | WO 2013/158918 | 10/2013 |
| WO | WO 2013/158920 | 10/2013 |
| WO | WO 2013/184846 | 12/2013 |

OTHER PUBLICATIONS

Portions of prosecution history of AU2013249151, Feb. 26, 2015 (mailing date), Nicira, Inc.
Portions of prosecution history of EP13721458.1, Mar. 18, 2015 (mailing date), Nicira, Inc.
Portions of prosecution history of AU2013249152, Apr. 24, 2015 (mailing date), Nicira, Inc.
Author Unknown, "Private Network-Network Interface Specification Version 1.1 (PNNI 1.1)," The ATM Forum Technical Committee, Apr. 2002, 536 pages, The ATM Forum.
Author Unknown, "Virtual Machine Backup Guide," Nov. 2007, pp. 1-78, VMware, Inc., Palo Alto, California.
Belaramani, Nalini, et al., "PRACTI Replication," Proc. of NSDI, May 2006, 14 pages.
Casado, Martin, et al., "SANE: A Protection Architecture for Enterprise Networks," Proceedings of the 15th USENIX Security Symposium, Jul. 31, 2006, pp. 137-151.
Ciavaglia, Laurent, et al., "An Architectural Reference Model for Autonomic Networking, Cognitive Networking and Self-management," Draft ETSI GS AFI 002 V0.0.17, Mar. 2012, 179 pages, http://www.etsi.org.
Fernandes, Natalia C., et al., "Virtual Networks: isolation, performance, and trends," Annals of Telecommunications, Oct. 7, 2010, pp. 339-355, vol. 66, Institut Telecom and Springer-Verlag, Paris.
Koponen, Teemu, et al., "Onix: A Distributed Control Platform for Large-scale Production Networks," In Proc. OSDI, Oct. 2010, pp. 1-14.
Krishnaswamy, Umesh, et al., "ONOS Open Network Operating System—An Experimental Open-Source Distributed SDN OS," Apr. 16, 2013, 4 pages.
Pankaj, Berde, et al., "ONOS Open Network Operating System an Open-Source Distributed SDN OS," Dec. 19, 2013, 44 pages.
Schneider, Fred B., "Implementing Fault-Tolerant Services Using the State Machine Approach: A Tutorial," ACM Computing Surveys, Dec. 1990, 21 pages, vol. 22, No. 4, ACM.
Stribling, Jeremy, et al., "Flexible, Wide-Area Storage for Distributed Systems with WheelFS," NSDI '09: 6th USENIX Symposium on Networked Systems Design and Implementation, Apr. 2009, pp. 43-58, USENIX Association.
Terry, Douglas B., "Managing Update Conflicts in Bayou, a Weakly Connected Replicated Storage System," SIGOPS '95, Dec. 1995, pp. 172-183, ACM, Colorado, USA.
International Search Report and Written Opinion for PCT/US2013/037232, Oct. 1, 2013 (mailing date), Nicira, Inc.
International Preliminary Report on Patentability for PCT/US2013/037232, Oct. 30, 2014 (mailing date), Nicira, Inc.
Wang, Wei-Ming, et al., "Analysis and implementation of an Open Programmable Router Based on Forwarding and Control Element Separation," Journal of Computer Science and Technology, vol. 23, No. 5, Sep. 2008, pp. 769-779.
Reitblatt, Mark, et al., "Consistent Updates for Software-Defined Networks: Change You Can Believe In!" Proceedings of the 10th ACM Workshop on Hot Topics in Networks, Nov. 14-15, 2011, 6 pages, ACM, Cambridge, MA.
International Search Report and Written Opinion for PCT/US2017/013820, dated May 4, 2017, Nicira, Inc.
Kent, William, "A Simple Guide to Five Normal Forms in Relational Database Theory," Communications of the ACM, Feb. 1, 1983, 6 pages, vol. 26, No. 2, Association for Computing Machinery, Inc., USA.

* cited by examiner

USING TRANSACTIONS TO MINIMIZE CHURN IN A DISTRIBUTED NETWORK CONTROL SYSTEM

CLAIM OF BENEFIT TO PRIOR APPLICATIONS

This application is a national stage application of PCT Application PCT/US2013/037232, filed Apr. 18, 2013, now published as WO 2013/158918. PCT Application PCT/US2013/037232 claims benefit of U.S. Provisional Patent Application 61/635,056, filed Apr. 18, 2012; U.S. Provisional Patent Application 61/635,226, filed Apr. 18, 2012; U.S. Provisional Patent Application 61/647,516, filed May 16, 2012; and U.S. Provisional Patent Application 61/684,693, filed Aug. 17, 2012. PCT Application PCT/US2013/037232, published as WO 2013/158918, and U.S. Provisional Patent Applications 61/635,056, 61/635,226, 61/647,516, and 61/684,693 are incorporated herein by reference.

BACKGROUND

Many current enterprises have large and sophisticated networks comprising switches, hubs, routers, servers, workstations and other networked devices, which support a variety of connections, applications and systems. The increased sophistication of computer networking, including virtual machine migration, dynamic workloads, multi-tenancy, and customer specific quality of service and security configurations requires a network control system that is capable of handling the sophistication. Distributed network control systems have been provided to handle these large, sophisticated networks in a distributed manner. However, it is often the case that a change in the network state made by one component of the distributed network control system ripples through the rest of the system back and forth and thereby causes a churn in the distributed network control system.

BRIEF SUMMARY

Some embodiments of the invention provide a particular network controller that receives inputs from a first controller and a second controller in the upper layer of a hierarchy formed by several network controllers. The particular controller processes the inputs from the first and second controllers to generate outputs in a manner that the outputs are not different than the outputs that would have been generated by processing the inputs from the first controller alone.

In particular, the particular controller of some embodiments receives a first set of inputs from the first controller and a second set of inputs from the second controller. The particular controller then starts to compute a set of outputs using the first set of inputs. After a failure of the first controller, the particular controller receives a third set of inputs from the second controller. The third set of inputs and the first or second set of inputs make up a group of inputs for being processed together and separately from another group of inputs.

The particular controller then receives an indicator from the second controller, which indicates that all inputs of the group of inputs have arrived at the particular controller. After receiving the indicator and after computing the set of outputs completely, the particular controller sends the set of outputs to a fourth controller or to a managed forwarding element. The fourth controller subsequently processes the set of outputs from the particular controller and sends the processed outputs to the managed forwarding element.

Some embodiments of the invention also provide a network controller in a middle layer of the hierarchy that receives the inputs from each of several different controllers in a layer above in the hierarchy. The inputs from the upper layer controllers come in as several different transactions. In some embodiments, the lower layer controller generates the outputs from the inputs received from the different controllers and sends the generated outputs to a set of controllers in a layer below in the hierarchy as a single transaction.

Specifically, the middle-layer network controller receives several groups of inputs from a set of upper-layer network controllers. Each group of inputs is for being processed together and separately from another group of inputs. When the groups of inputs meet certain conditions, the middle-layer network controller processes two or more of the groups of inputs together to generate a set of outputs. When the groups of inputs do not meet the certain conditions, the network controller processes the groups of inputs by processing one group of inputs together at a time to generate a set of outputs. The network controller then sends the generated set of outputs to a set of controllers in a layer below.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
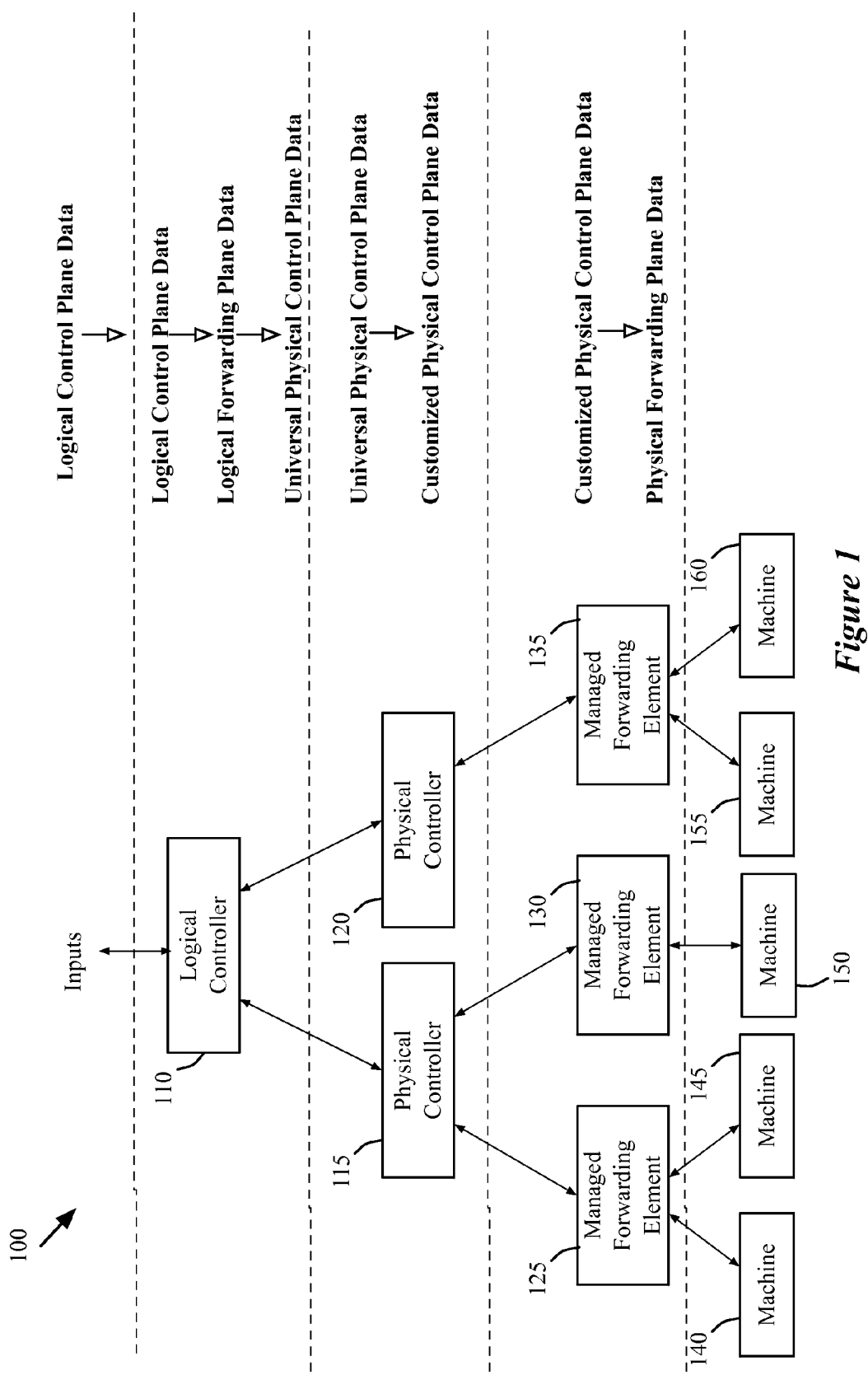
FIG. 1 describes an example hierarchy of network controllers.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network control system in which network controllers compute forwarding state information to push to a set of managed forwarding elements in order to define forwarding behaviors of the set of managed forwarding elements. In some embodiments, the network controllers form a hierarchy that has several layers of controllers. A set of logical controllers is located in the top layer of the hierarchy and generates universal physical control plane data from input logical control plane data. A layer below the set of logical controllers is a set of physical controllers that, in some embodiments, customizes the universal control plane data into physical control plane data that is specific to the managed forwarding elements.

In some embodiments, the physical controllers relay the universal physical control plane data to a set of chassis controllers that actually performs the customization for the managed forwarding elements. In these embodiments, the chassis controllers are at the bottom layer of the hierarchy formed by the controllers. The physical controllers or the chassis controllers interface with the managed forwarding elements and feed the customized physical control plane data to the managed forwarding elements. The managed forwarding elements forward data in the network using the data received from the controllers.

A particular controller in an upper layer of the hierarchy feeds the controller's output data into another controller in a layer below in the hierarchy. In some embodiments, the particular controller has a backup controller in the same layer, which operates as a hot standby or a redundant controller for the particular controller (e.g., by feeding the identical output data to the controller in the lower layer of the hierarchy). In some embodiments, the controller in the lower layer generates its own output from the output data received from the particular controller.

When the particular controller fails, the controller in the lower layer generates its own output data from (1) the output data so far received from the particular controller and (2) the output data from the backup controller, in a manner that the output data is not affected by processing the identical output data from the backup controller. That is, after a failure of the particular controller, the controller in the lower layer receives and processes the output data from the backup controller that includes the data identical with the data that had been received from the particular controller before the failure. However, the controller in the lower layer processes the output data from the backup controller in a manner that the output data of the controller in the lower layer is not different than the output data that would have been generated by processing the output data from the particular controller alone.

A controller in a lower layer of the hierarchy receives the output data from each of several different controllers in the layer above. The output data from the upper layer controllers come in as several different transactions. In some embodiments, the lower layer controller generates its own output data from the output data received from the different controllers and sends its own output data to a set of controllers in a layer below the lower layer as a single transaction.

More detailed embodiments are described in the following sections. Specifically, Section I first describes a network control system of some embodiments for controlling logical and physical networks. Next, Section II describes minimizing a rate of updates. Section III then describes an electronic system with which some embodiments of the invention are implemented.

I. Network Control System

FIG. 1 illustrates a network control system 100 in which network controllers compute forwarding state information to push to a set of managed forwarding elements in order to define forwarding behaviors of the set of managed forwarding elements. The network control system 100 includes a logical controller 110, two physical controllers 115 and 120, and three managed forwarding elements 125-135. The network control system 100 represents a simplified example, with two physical controllers 115 and 120 pushing state down to three managed forwarding elements. In many cases, the network control system of some embodiments would include numerous controllers and hundreds or thousands of managed forwarding elements.

In some embodiments, the network controllers 110-120 perform computation of forwarding state and pushes this state down to the managed forwarding elements in the form of flow entries. The network controllers of some embodiments receive logical control plane (LCP) data that defines a logical network and converts this LCP data into physical control plane (PCP) data to send to the managed forwarding elements 125-135. The logical control plane of a logical network, in some embodiments, defines one or more logical forwarding elements (e.g., logical switches, logical routers) that connect end machines (e.g., virtual machines) in a logical address space. The logical forwarding elements define how packets from a source machine should be forwarded in the logical space to a destination machine (e.g., the binding of virtual machine MAC addresses to logical ports). In addition, in some embodiments the LCP defines logical policies (e.g., access control lists) implemented by the logical forwarding elements. The LCP and its constructs are agnostic to the physical network through which it is implemented.

The network controllers of some embodiments perform several distinct conversions of the LCP data to arrive at the PCP data that is pushed down to the managed forwarding elements. In some embodiments, the controllers convert the LCP data into logical forwarding plane (LFP) data, and then subsequently convert the LFP data into PCP data. The LFP data defines forwarding entries for forwarding packets in the logical space. That is, beyond simply binding an address to a logical port, the LFP data includes an entry stating that if the address is matched, to forward the packet to the logical port.

The conversion of the LFP data to PCP data integrates the logical forwarding entries into the physical network. The PCP entries contain information to perform forwarding in the logical address space within the physical network (e.g., mapping logical ports to physical ports, etc.).

In some embodiments, the computation of PCP to push to the managed forwarding elements is distributed between different layers of controllers in a hierarchy formed by the controllers. For instance, in some embodiments, the logical controller 110 manages at least one logical forwarding element. The logical controller 110 performs the LCP to LFP conversion and a subsequent LFP to universal PCP (UPCP) conversion as indicated by the right half of this figure. UPCP data includes flow entries that have not been customized to include data specific to any managed forwarding element, and instead only include abstractions for such data that is specific to a particular physical implementation (e.g., port numbers, tunnel identifiers, etc.).

The logical controller that manages a particular logical forwarding element sends the UPCP data to any number of physical controllers in some embodiments. For instance, the logical controller 110 sends the UPCP data to the two physical controllers 115 and 120. Each managed forwarding element is managed by a master physical controller. Thus, UPCP data for a logical forwarding element implemented across several managed forwarding elements may be sent to the several different master physical controllers that managed these forwarding elements. As shown, the physical controller 115 is the master controller that manages two managed forwarding elements 125 and 130. The physical controller 120 is the master controller that manages the managed forwarding element 135.

At either the physical controller, or a chassis controller (not shown in this figure) in the same physical machine as the managed forwarding element, the UPCP data is converted to customized PCP (CPCP) data. The CPCP data is the physical control plane data with the customization data particular to a specific managed forwarding element filled in. As mentioned, in some embodiments the physical controller performs this conversion using information received from the managed forwarding element. In other embodiments, the physical controller acts as a pass-through to send the UPCP data to the host machine on which the managed forwarding element resides, where controller logic (the chassis controller) performs the UPCP to CPCP conversion.

The managed forwarding elements 125-135 are software or hardware forwarding elements that are managed by (e.g., receive forwarding state information from) the network controller. In some embodiments, the managed forwarding elements are software forwarding elements that operate on a host machine (e.g., within the user space and/or kernel of the host machine). These managed forwarding elements receive packets from end machines 140-160, perform logical processing on the packets, and send the packets across the physical network to their destination (e.g., at another end machine also connected to a different managed forwarding element).

The end machines 140-160 may be physical machines or virtual machines. In some embodiments, the end machines as virtual machines operate in the same hosts with the managed forwarding elements that forward packets for the end machines. Because virtual machines belonging to multiple physical networks may be located within a single host machine (e.g., the end machines 140 and 145 may be located within the same host machine in which the managed forwarding element 125 is located), each managed forwarding element may implement multiple different logical forwarding elements. Additionally, as indicated above, a single logical forwarding element will generally be implemented across numerous managed forwarding elements.

In addition to the managed forwarding elements located at the network edge, on hosts with the virtual machines, some embodiments additionally include second-level non-edge managed forwarding elements (referred to in some cases as pool nodes or service nodes). When an edge managed forwarding element is unable to perform all of the processing for a packet (e.g., because it does not have a flow entry for binding a destination MAC address to a logical port), the edge managed forwarding element sends the packet to a pool node in order for the pool node to process the packet and send the packet towards its destination.

Figure 2:
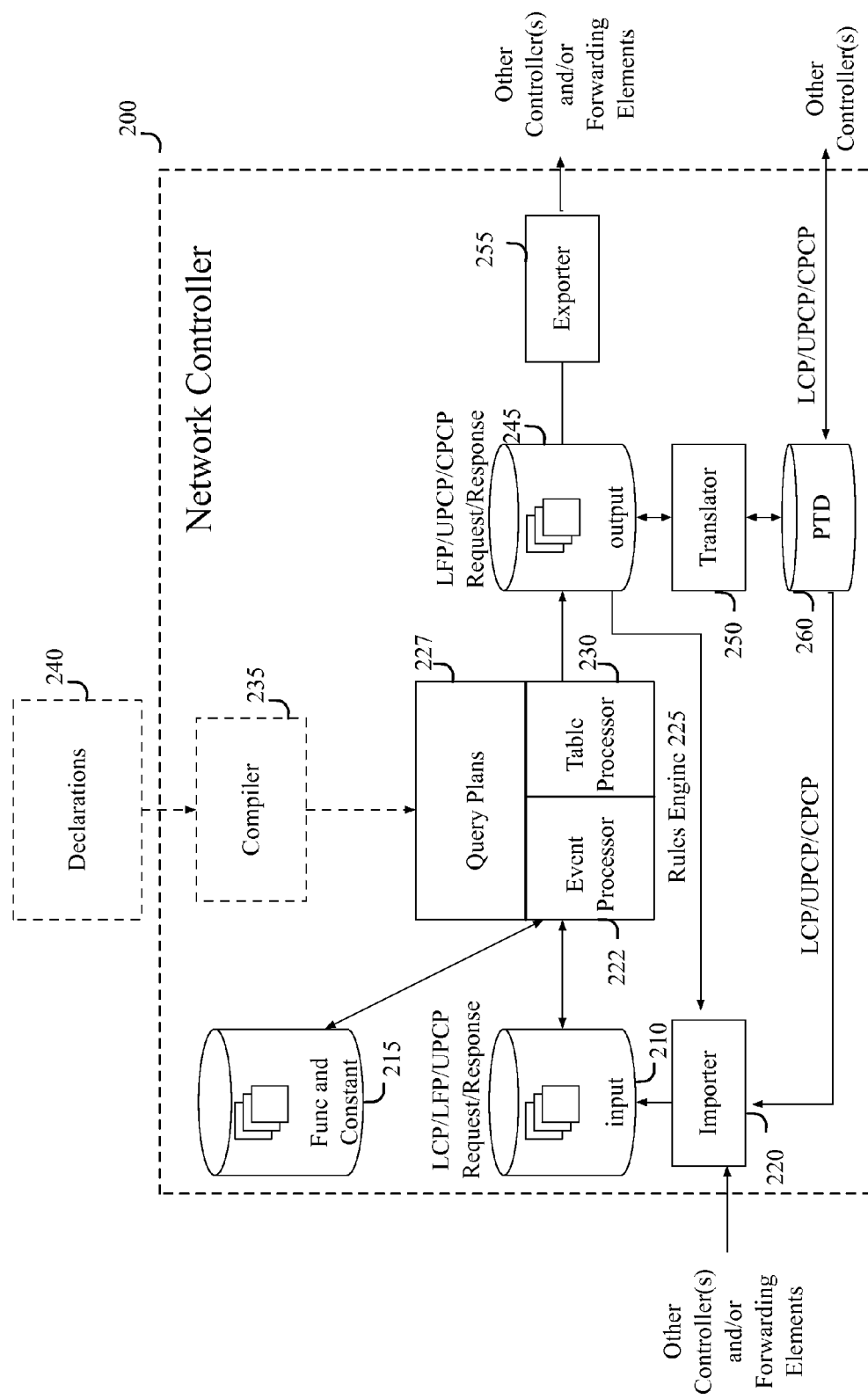
FIG. 2 illustrates architecture of a network controller of some embodiments.

FIG. 2 conceptually illustrates example architecture of a network controller 200 of some embodiments. The network controller 200 is capable of functioning as a logical controller, a physical controller, or a chassis controller, depending on the types of data that the network controller 200 handles.

As a logical controller, the network controller 200 takes as inputs the LCP data. The network controller 200 translates the LCP data into LFP data and then into the UPCP data in some embodiments. The network controller 200 pushes the UPCP data to a set of physical controllers that are masters of the managed forwarding elements that implement the logical forwarding elements that the network controller 200 as a logical controller manages.

As a physical controller of some embodiments, the network controller 200 takes as inputs the UPCP data and translates the UPCP data into the CPCP data. The network controller then pushes the CPCP data to a set of managed forwarding elements of which the network controller 200 is a master. In other embodiments, the network controller 200 as a physical controller relays the UPCP data to a set of chassis controllers that operate in the hosts in which a set of managed forwarding elements operate. The network controller 200 is the master of this set of managed forwarding elements in these embodiments.

As a chassis controller, the network controller 200 takes as inputs the UPCP data from a set of physical controllers. The network controller 200 translates the UPCP data to the CPCP data for a managed forwarding element that the chassis controller manages and then sends the CPCP data to the managed forwarding element.

As shown in FIG. 2, the network controller 200 includes a set of rule-engine input tables 210, a set of function and constant tables 215, an importer 220, a rules engine 225, a set of rule-engine output tables 245, a translator 250, an exporter 255, a persistent transactional database (PTD) 260, and a compiler 235. The compiler 235 is one component of the controller that operates at a different instance in time than the controller's other components. The compiler operates when a developer needs to specify the rules engine for a particular network controller and/or virtualized environment, whereas the rest of the controller's modules operate at runtime when the controller interfaces with other controllers or managed forwarding elements.

In some embodiments, the compiler 235 takes a relatively small set (e.g., few hundred lines) of declarative instructions 240 that are specified in a declarative language and converts these into a large set (e.g., thousands of lines) of code (i.e., object code) that specifies the operation of the rules engine 225, which performs the controller's table mapping. As such, the compiler greatly simplifies the network controller developer's process of defining and updating the network controller. This is because the compiler allows the developer to use a high level programming language that allows a compact definition of the network controller's complex mapping operation and to subsequently update this mapping operation in response to any number of changes (e.g., changes in the logical networking functions supported by the network controller, changes to desired behavior of the network controller, etc.). Moreover, the compiler relieves the developer from considering the order at which the events would arrive at the network controller, when the developer is defining the mapping operation. Also, the developer programs the network controller 200 with different rules sets to make the network controller 200 function as a logical controller, a physical controller, or a chassis controller.

In some embodiments, the rule-engine (RE) input tables 210 include tables with different types of data based on the type of network controller as which the network controller 200 operates. The input tables 210 include LCP data that need to be mapped to LFP data, and include LFP data that need to be mapped to UPCP data when the network controller 200 operates as a logical controller. The input tables 210 include UPCP data that need to be mapped to CPCP data when the network controller 200 operates as a physical controller or as a chassis controller.

In addition to the RE input tables 210, the network controller 200 includes other miscellaneous tables 215 that the rules engine 225 uses to gather inputs for its table mapping operations. These tables 215 include constant tables that store defined values for constants that the rules engine 225 needs to perform its table mapping operations. For instance, the constant tables 215 may include a constant "zero" that is defined as the value 0, a constant "dispatch_port_no" as the value 4000, and a constant "broadcast_MAC_addr" as the value 0xFF:FF:FF:FF:FF:FF.

When the rules engine 225 references constants, the corresponding value defined for the constants are actually retrieved and used. In addition, the values defined for constants in the constant tables 215 may be modified and/or updated. In this manner, the constant tables 215 provide the ability to modify the value defined for constants that the rules engine 225 references without the need to rewrite or recompile code that specifies the operation of the rules engine 225. The tables 215 further include function tables that store functions that the rules engine 225 needs to use to calculate values needed to populate the output tables 245.

The rules engine 225 performs table mapping operations that specifies one manner for converting the input data to the output data. Whenever one of the rule-engine (RE) input tables is modified, the rules engine performs a set of table mapping operations that may result in the modification of one or more data tuples in one or more RE output tables. In some embodiments, the network control system uses a variation of the datalog database language, called nLog, to create the rules engine 225. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

As shown in FIG. 2, the rules engine 225 includes an event processor 222, several query plans 227, and a table processor 230. Each query plan is a set of rules that specifies a set of join operations that are to be performed upon the occurrence of a modification to one of the RE input tables. Such a modification is referred to below as an input table event. Each query plan is generated by the compiler 235 from one declaratory rule in the set of declarations 240. In some embodiments, more than one query plan is generated from one declaratory rule. For instance, a query plan is created for each of the tables joined by one declaratory rule. That is, when a declaratory rule specifies to join four tables, four different query plans will be created from that one declaration. In some embodiments, the query plans are defined by using the nLog declaratory language.

The event processor 222 of the rules engine 225 detects the occurrence of each input table event. The event processor of different embodiments detects the occurrence of an input table event differently. In some embodiments, the event processor registers for callbacks with the RE input tables for notification of changes to the records of the RE input tables. In such embodiments, the event processor 222 detects an input table event when it receives notification from an RE input table that one of its records has changed.

In response to a detected input table event, the event processor 222 (1) selects the appropriate query plan for the detected table event, and (2) directs the table processor 230 to execute the query plan. To execute the query plan, the table processor 230, in some embodiments, performs the join operations specified by the query plan to produce one or more records that represent one or more sets of data values from one or more input and miscellaneous tables 210 and 215. The table processor 230 of some embodiments then (1) performs a select operation to select a subset of the data values from the record(s) produced by the join operations, and (2) writes the selected subset of data values in one or more RE output tables 245.

In some embodiments, the RE output tables 245 store both logical and physical network element data attributes. The tables 245 are called RE output tables as they store the output of the table mapping operations of the rules engine 225. In some embodiments, the RE output tables can be grouped in several different categories. For instance, in some embodiments, these tables can be RE input tables and/or controller output tables. A table is an RE input table when a change in the table causes the rules engine to detect an input event that requires the execution of a query plan. A RE output table 245 can also be an RE input table 210 that generates an event that causes the rules engine to perform another query plan. Such an event is referred to as an internal input event, and it is to be contrasted with an external input event, which is an event that is caused by an RE input table modification made by the importer 220.

A table is a controller output table when a change in the table causes the exporter 255 to export a change to another controller(s) or managed forwarding element(s). A table in the RE output tables 245 can be an RE input table, a controller output table, or both an RE input table and a controller output table. In some embodiments, the RE input tables and the RE output tables are tables of a relational database management system (RDBMS). These tables are stored as relational database data structures, which are the primary data storage structure of the network controller.

The exporter 255 detects changes to the controller output tables of the RE output tables 245. The exporter of different embodiments detects the occurrence of a controller output table event differently. In some embodiments, the exporter registers for callbacks with the controller output tables for notification of changes to the records of the controller output tables. In such embodiments, the exporter 255 detects an output table event when it receives notification from a controller output table that one of its records has changed.

In response to a detected output table event, the exporter 255 takes some or all of modified data tuples in the modified controller output tables and propagates this modified data tuple(s) to other controllers or managed forwarding elements. Specifically, when the network controller 200 operates as a logical controller, the exporter 255 propagates the UPCP data to a set of physical controllers through a set of communication channels (e.g., remote procedure call (RPC) channels) established with the physical controllers. When the network controller 200 operates as a physical controller, the exporter 255 of some embodiments propagates the UPCP data to a set of chassis controllers through a set of communication channels established with the chassis controllers. The exporter 255 of other embodiments propagates the CPCP data to a set of managed forwarding elements through a pair of communication channels (e.g., an OpenFlow channel and a configuration channel) established with each of the managed forwarding elements. When the network controller 200 operates as a chassis controller, the exporter 255 of some embodiments propagates the CPCP data to a set of managed forwarding elements through a pair of communication channels (e.g., an OpenFlow channel and a configuration channel) with each of the managed forwarding elements.

In some embodiments, the network controller does not keep in the output tables 245 the data that the network controller is not responsible for managing. However, such data will be translated by the translator 250 into a format that can be stored in the PTD and gets stored in the PTD 260. The PTD is a secondary storage structure for the network controller. The PTD of the network controller 200 propagates this data to one or more other network controllers so that some of the other network controllers that are responsible for managing the data can process the data.

In some embodiments, the network controller also brings the data stored in the output tables 245 (i.e., the data that the network controller is responsible for managing) to the PTD for resiliency of the data. Such data is also translated by the translator 250, stored in the PTD, and propagated to other PTDs of other controller instances. Therefore, in these embodiments, a PTD of a controller instance has all the configuration data for all data managed by the network control system. That is, each PTD contains the global view of the configuration of the logical and physical network in some embodiments.

The importer 220 interfaces with a number of different sources of input data and uses the input data to modify or create the input tables 210. The importer 220 of some embodiments receives the input data from a user (a tenant) through an input translation controller (not shown) that translates the user inputs (e.g., in a form of application programming interface (API) calls) into LCP data when the network controller 200 operates as a logical controller. The importer 220 receives the LCP data through communication channels in some embodiments. The importer 220 also interfaces with the PTD 260 so that the data received through the PTD from other controller instances can be used as input data to modify or create the input tables 210. Moreover, the importer 220 also detects changes in the RE input tables and controller output tables of the RE output tables 245. The LFP data produced and stored in the output tables 245 are fed back to the rules engine 225 by the importer 220 for the rules engine 225 to produce the UPCP data.

When the network controller 200 operates as a physical controller, the importer 220 gets the UPCP data from a set of logical controllers through a set of communication channels established with the set of logical controllers. When the network controller 200 operates as a chassis controller, the importer gets the UPCP data from a set of physical controllers through a set of communication channels established with the set of physical controllers.

So far in this figure, it has been described that the input tables 210 include the inputs from the controllers in the upper layer of the controller hierarchy and the output tables 245 include the outputs to the controllers in the lower layer of the controller hierarchy or to a set of managed forwarding elements. In some cases, the inputs and outputs come and go in the opposite direction. That is, in these cases, the network controller takes inputs from the controllers in the lower layer or from the managed forwarding elements and sends outputs to the controllers in the upper layer. For instance, the network controller 200 may receive a request that originates from a user and distributes the request to a set of controllers in the lower layer or to a set of managed forwarding elements. These distributed requests reach the managed forwarding elements, which prepare responses. The responses come back to the network controller 200 as inputs through the importer. The rules engine 255 perform table mapping operations to combine the responses into a response to send up to the controller that had sent the request to the network controller 200. More details about processing requests and responses will be described further below by reference to FIGS. 9 and 10.

Having described a network control system in which network controllers form a hierarchy, Section II below describes minimizing churn in the network control system by combining transactions.

II. Minimizing Rate of Updates

A. Reordering External Inputs

In a network control system, network controllers manage the network state to implement logical networks over a physical network. The network state is not a constant, and as the state changes, updates to the state must be distributed to the managed forwarding elements throughout the network. These updates to the network state may appear for at least three reasons. First, when logical policy changes because the network policy enforced by the logical pipeline is reconfigured (e.g., the updating of access control lists by an administrator of a logical network), the network state changes. Second, workload operational changes result in a change to the network state. For instance, when a virtual machine migrates from a first node to a second node, the logical view remains unchanged. However, the network state requires updating due to the migration, as the logical port to which the VM attaches is now at a different physical location. Third, physical reconfiguration events, such as device additions, removals, upgrades and reconfiguration, may result in changes to the network state.

While a typical user-driven change to the policy configuration causes a minor incremental change and this incremental change to the forwarding state can be computed efficiently, failover conditions may cause larger input changes to the nLog computation engine. Consider a receiving controller, which is configured to receive inputs from a source controller, after the source controller crashes and a new controller subsumes the source controller's tasks. While the new controller was a backup controller and therefore had the state pre-computed, the receiving controller still has to do the failover from the old source to a new source.

In some embodiments, the receiving controller would simply tear down all the input received from the crashed controller (revert the effects of the inputs) and then feed the new inputs from the new controller to the nLog computation engine even if it would be predictable that the old and new inputs would most likely be almost identical, if not completely identical. While the transactionality of the computation would prevent any changes in the forwarding state from being exposed before the new source activates and computation reaches its fixed point (e.g., a point at which the computation is done for a given input data), the computational overhead could be massive: the entire forwarding state would be computed twice, first to remove the state, and then to re-establish the state.

In some embodiments, the receiving controller identifies the difference in the inputs from the old and new sources and would compute forwarding state changes only for the changed inputs. This would eliminate the overhead completely. However, with transactional computation and with the ability to reach a fixed point, the receiving controller of some embodiments can achieve the same result, without identifying the difference. To achieve a gradual, efficient migration from an input source to another without identifying the difference, the network control system simply does not start by tearing down the inputs from the old source but instead feeds the inputs from the new source to the computation engine while the inputs from the old source are still being used. The network control system then waits for the new source to reach the fixed point for the inputs from the new source, and only after that, deletes the inputs from the old source.

By re-ordering the external inputs/events in this manner, the nLog computation engine of some embodiments can detect the overlap and avoid the overhead of completely tearing down the old state. Without needing to tear down the state from the old source, the receiving controller does not commit the transaction until the new source reaches the fixed point. Once the new source reaches the fixed point, the receiving controller pushes any changes to the forwarding state (i.e., the output state) due to the changed inputs to the consuming forwarding elements. If the changes are significant, this approach comes with the cost of increased transient memory usage. In some embodiments, the source controller sends a barrier when the source controller reaches the fixed point. When the barrier is received at the receiving controller, the receiving controller recognizes that the source controller has reached the fixed point.

Figure 3:
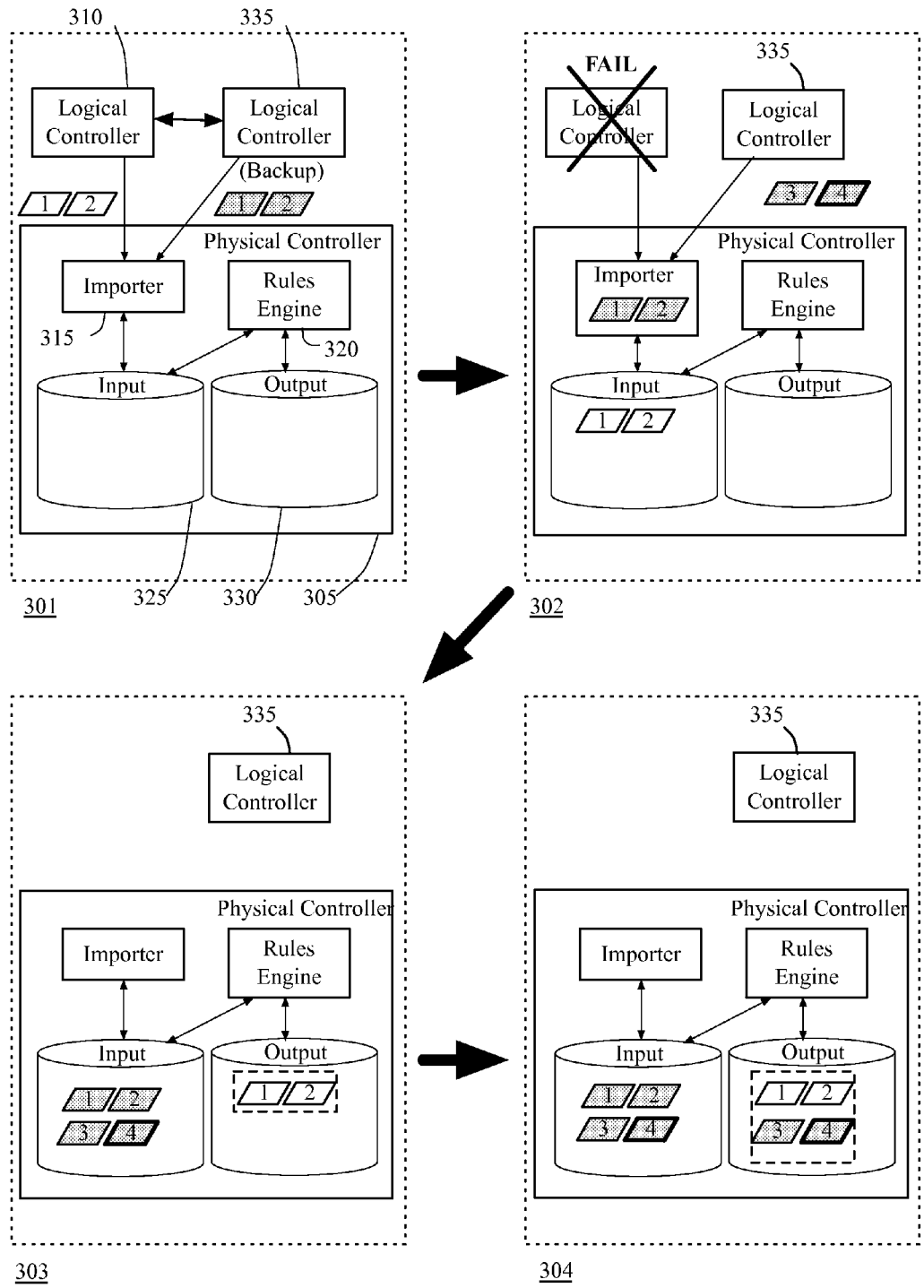
FIG. 3 conceptually illustrates a physical controller that receives inputs from a logical controller.

FIG. 3 conceptually illustrates a physical controller 305 that receives inputs from a logical controller 310. In particular, this figure illustrates in four different stages 301-304 the physical controller 305's handling of inputs when the logical controller 310 fails and a logical controller 335 takes over the task of computing and sending updates to the physical controller 305. The logical controller 335 is a hot standby logical controller for the logical controller 310.

The physical controller 305 is similar to the network controller 200 described above by reference to FIG. 2 in that the physical controller 305 includes an importer 315, a rules engine 320, input tables 325, and output tables 330, which are similar to their corresponding components of the controller 200. For simplicity of discussion, not all components of the physical controller 305 are shown in FIG. 3.

At the first stage 301, the logical controller 310 is sending input changes 1 and 2, depicted as white parallelograms, to the physical controller 305. The input changes are the changes to one or more records of the input tables of a controller. In some embodiments, the input changes are in the form of data tuples. The logical controller 335 also sends the same changes 1 and 2 to the physical controller 305. The changes 1 and 2 coming from the backup logical controller 335 are depicted as grey parallelograms to visually distinguish them from the changes 1 and 2 from the logical controller 310.

At the second stage 302, the physical controller 305 has received the changes 1 and 2 from the logical controller 310 and the changes 1 and 2 from the logical controller 335. However, the importer 315 has updated the input tables 325 with the changes 1 and 2 from the logical controller 310 only and has held the changes 1 and 2 from the backup logical controller 335 in a storage structure (not shown).

In some embodiments, the physical controller 305 does not recognize that the logical controller 335 is a backup controller for the logical controller 310. That is, from the physical controller 305's point of view, the logical controllers 310 and 335 are two controllers feeding the identical input changes. The physical controller 305 locally decides to use changes from one of the controllers and switches over to the other controller if the controller of which the changes have been used fails. At stage 302, the physical controller 305 uses the changes from the logical controller 310.

The stage 302 also shows that the logical controller 310 has failed and the logical controller 335 is sending changes 3 and 4 after the logical controller 310 has failed. The change 4 is depicted as having bold borderline to indicate that the change 4 is the last change of a transaction from the logical controller 335. In other words, the changes 3 and 4 make up a transaction and the change 4 (or separate data after change 4) has a barrier that indicates end of a set of inputs for one transaction. The rules engine 320 has not processed the changes 1 and 2 yet because, for example, the rules engine 320 has not finished processing other changes (not shown).

The third stage 303 shows that the rules engine 320 has performed table mapping operations to generate a set of output changes from the changes 1 and 2. The output changes are changes made to one or more records of the output tables of a controller as a result of performing table mapping operations on the input tables that are changed by the input changes. In some embodiments, the output changes are in the form of data tuples. The output changes are depicted as a dashed-line box including the changes 1 and 2 to indicate that these output changes are results of processing the changes 1 and 2 from the logical controller 310. Also at the third stage 303, the importer 315 has updated the input tables 325 with the changes 1 and 2 from the logical controller 335 that had been held in the storage structure. The importer 315 has also removed the changes 1 and 2 from the logical controller 310 because the logical controller 310 has failed and the logical controller 335 has switched over to the logical controller 335 from which to receive changes. Moreover, the physical controller 305 has received the changes 3 and 4 from the logical controller 335. The importer 315 updates the input tables 325 with the changes 3 and 4.

The fourth stage 304 shows that the rules engine 320 has performed table mapping operations to generate output changes from the changes 1-4 received through the backup logical controller 335. The output changes, depicted as a dashed-line box that includes changes 1-4, indicate that the output changes are the same as the output changes that would have been generated if the importer had not updated input tables with the changes 1 and 2 twice (once from the changes 1 and 2 from the logical controller 310 and another time from the changes 1 and 2 from the logical controller 335). This is because the rules engine of some embodiments does not produce duplicative output changes from performing table mapping operations on duplicative input changes.

Because the physical controller has processed all input changes that make up a transaction from the upper layer controllers, the physical controller 335 has reached its own fixed point. The physical controller 335 will subsequently send this set of output changes to a set of managed forwarding elements or a set of chassis controllers. FIG. 3 illustrates handling of a logical controller failover by a physical controller. However, one of ordinary skill in the art will recognize that a chassis controller may handle a physical controller failover similarly.

Figure 4:
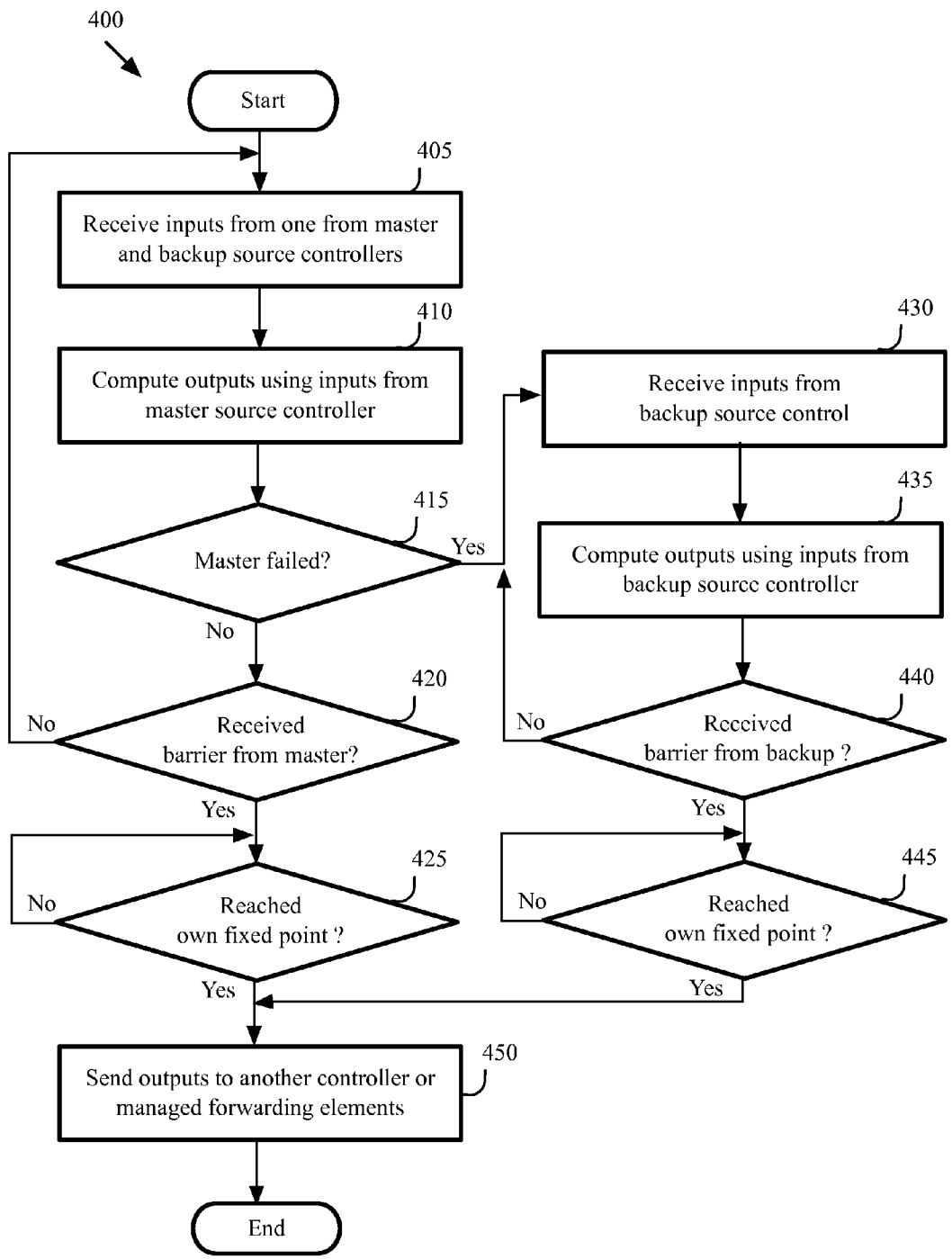
FIG. 4 conceptually illustrates a process that some embodiments perform to handle a failover of a source controller that is in a layer above in a hierarchy of network controllers.

FIG. 4 conceptually illustrates a process 400 that some embodiments perform to handle a failover of a source controller that is in a layer above in a hierarchy of network controllers. The process 400 is performed by a receiving controller that receives input changes from two or more source controllers that generate the input changes. In some embodiments, the receiving controller is a physical controller that receives input changes from a set of logical controllers that generate the input changes including UPCP data. Also, the receiving controller can be a chassis controller that receives input changes from a set of physical controllers that relay the UPCP data. The receiving controller of some embodiments is similar to the physical controller 305 described above by reference to FIG. 3.

The process 400 begins by receiving (at 405) input changes from a master source controller and a backup source controller. The backup controller is a standby or redundant controller that sends the same input changes to the receiving controller as the master controller does. In some embodiments, the receiving controller does not recognize which of the two source controllers is a master controller. The receiving controller selects one of them and uses the input changes from the selected source controller to generate the receiving controller's own output changes. For the purpose of discussion, the master source controller is the controller that is initially selected by the receiving controller.

Next, the process 400 computes (at 410) output changes using inputs from the master controller only. The process 400 of some embodiments sets aside the redundant input changes from the backup controller in a storage structure until a transaction (e.g., a set of input changes between barriers) is completely received from the master source controller. The process 400 of some embodiments does not use the input changes that are set aside in the storage structure. The process 400 of some embodiments does not remove the input changes that are received from the master controller from the input tables.

The process 400 determines (at 415) whether the master source controller has failed. In some embodiments, a source controller transmits its status or heartbeat periodically and the receiving controller uses the status to determine whether the source controller is alive. In some embodiments, the receiving controller polls the source controller to determine whether the source controller is alive. When the process 400 determines (at 415) that the master source controller has failed, the process 400 proceeds to 430, which will be described further below.

When the process 400 determines (at 415) that the master source controller has not failed, the process 400 determines (at 420) whether the process has received a barrier from the master controller. That is, the process determines whether the input changes that the process has been receiving make up a complete transaction. When the process 400 determines (at 420) that the process has not received a complete transaction from the master source controller, the process 400 loops back to 405 to continue receiving input changes from the master and backup source controllers.

When the process 400 determines (at 420) that the process has received a barrier from the master source controller, the process 400 determines (at 425) whether the process 400 has reached its own fixed point. The process 400 of some embodiments determines that it has reached its own fixed point when the process 400 has finished processing all of the received input changes of a transaction from the source master controller to generate the output changes. The process 400 then proceeds to 450, which will be described further below.

When the process 400 determines (at 415) that the master source controller has failed, the process switches to the backup source controller to receive (at 430) input changes from the backup controller. The process 400 then computes (at 435) the output changes based on the inputs received from the backup controller. In some embodiments, the process 400 also uses the changes that were set aside (at 410) to compute the output changes. The changes that were set side are duplicate changes of the input changes from the master source controller that have been used to generate output changes. The process 400, however, does not tear down the output changes that were generated from processing the same input changes received from the master source controller. The process 400 still processes the duplicate input changes that were set aside, but the rules engine of the receiving controller that performs the process 400 does not generate duplicate output changes from processing the duplicate input changes. The process 400 of some embodiments removes the changes that are received from the failed controller from the input tables as the process switches over to the backup source controller.

Next, the process 400 determines (at 440) whether the process has received a barrier from the backup source controller. That is, the process determines whether the input changes that the process has received make up a complete transaction. The input changes that make up a complete transaction would include the duplicate input changes that were set aside and any input changes that the process has received from the backup controller after the master controller failed.

When the process 400 determines (at 440) that the process has not received a barrier, the process 400 loops back to 430 to continue receiving input changes from the backup source controller. When the process 400 determines (at 440) that the process has received a barrier, the process 400 determines (at 425) whether the process 400 has reached its own fixed point.

Next, the process 400 sends (at 450) the computed output changes to a set of controllers that are in a layer below in the hierarchy of the controllers or to a set of managed forwarding elements that forwards data based on the output changes. The process 400 of some embodiments inserts a barrier at the end of the output changes or adds information to indicate a complete transaction to the last change of the output changes. The process then ends.

B. Transactions in Hierarchical Forwarding State Computation

In some embodiments, network controllers form a hierarchy with two or more layers of network controllers that feed updates to the forwarding elements that receive receiving transactional updates from multiple controllers. In these embodiments, the topmost controllers compute their updates in a transactional manner, but the controllers below them may receive updates from multiple topmost controllers; similarly, the forwarding elements may receive updates from multiple second level controllers.

The transactions may flow down without any changes in their boundaries; that is, a top-level transaction processed at the second level controller results in a transaction fed down to the forwarding elements containing only the resulting changes of that incoming transaction from the topmost controller. However, the consistency of the policies can be maintained even if the transactions are aggregated on their way down towards the forwarding elements. In some embodiments, a second level controller aggregates multiple incoming transactions (possibly from different topmost controllers) into a single transaction that is fed down to the forwarding elements. It is a local decision to determine which is the proper level of aggregation (if any). For instance, the system may implement an approach where the transactions are not aggregated at all by default, but in overload conditions when the number of transactions in the queues grows, the transactions are aggregated in hope of transactions (from the same source) having overlapping changes that can cancel each other. In the wider network context, one could consider this approach as one kind of route flap dampening.

Figure 5:
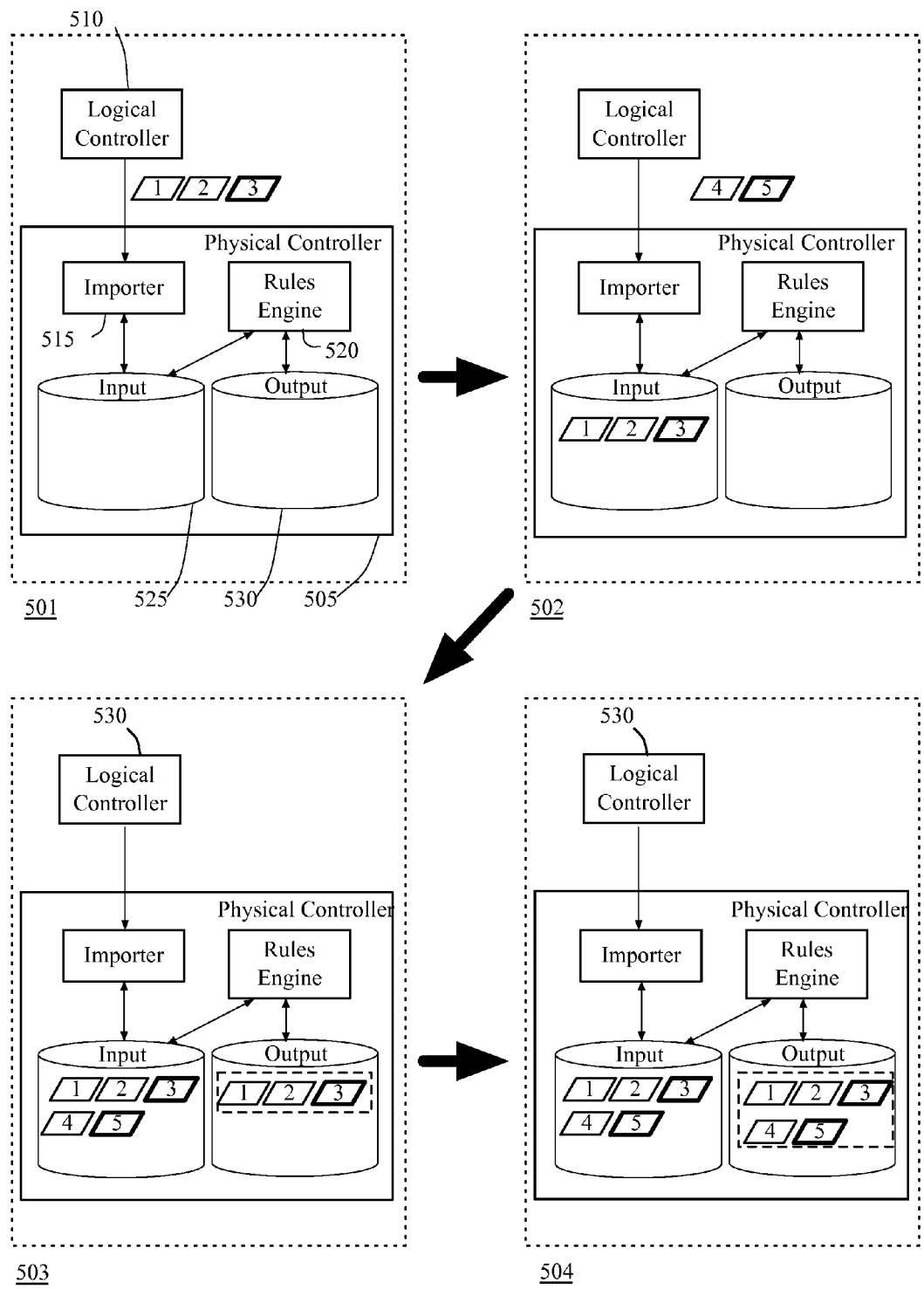
FIG. 5 conceptually illustrates a physical controller that receives inputs from a logical controller.

FIG. 5 conceptually illustrates a physical controller 505 that receives inputs from a logical controller 510. In particular, this figure illustrates in four different stages 501-504 that physical controller 505 aggregates input changes that make up several complete transactions from a logical controller 510 which feeds the input changes to the physical controller 505. The physical controller 505 is similar to the network controller 200 described above by reference to FIG. 2 in that the physical controller 505 includes an importer 515, a rules engine 520, input tables 525, and output tables 530, which are similar to their corresponding components of the controller 200. For simplicity of discussion, not all components of the physical controller 505 are shown in FIG. 5.

At the first stage 501, the logical controller 510 is sending input changes 1-3 to the physical controller 505. The change 3 is depicted to have a bold borderline to indicate that the changes 1-3 make up a complete transaction. That is, the change 3 includes a barrier or is accompanied by a barrier. At the stage 501, the input tables 525 and the output tables 530 are empty because the physical controller 505 has previously computed and sent out a set of transactional output changes.

At the second stage 502, the physical controller 505 has received the changes 1-3 from the logical controller 510. The importer 515 has updated the input tables 525 with the changes 1-3. The second stage 502 also shows that the logical controller is sending a next set of input changes 4 and 5 that makes up a transaction.

At the third stage 503, the physical controller 505 has received the next set of input changes 4 and 5 that make up a transaction from the logical controller 530. The importer 515 updates the input tables 525 with the changes 4 and 5. The third stage 503 also shows that the rules engine 520 has performed table mapping operations to generate a set of output changes from the changes 1-3 that were put into the input tables 525 at the previous stage 502. The output changes are depicted as a dashed-line box including the changes 1-3 to indicate that these output changes are results of processing the changes 1-3.

Also at the stage 503, the physical controller 505 determines whether (1) to send out the output changes currently in the output tables 530 because the controller has generated the output changes by processing a set of input changes that make up a complete transaction or (2) to wait for more input changes to come in. In some embodiments, the physical controller makes this determination based on certain criteria. For instance, the physical controller waits for more input changes to come in if a period of time has not elapsed since sending out the last set of output changes or since receiving the last transaction. In some of these embodiments, when the period of time elapses, the physical controller 505 aggregates all of the input changes that make up complete transactions to generate a single set of transactional output changes.

Alternatively or conjunctively, the physical controller 505 of some embodiments considers an amount of data in the input tables 525 have. In some of these embodiments, when the input tables 525 has more than a threshold amount of data, the physical controller 505 aggregates all of the input changes that make up complete transactions to generate a single set of transactional output changes. Instead of or in conjunction with considering the amount of data, the physical controller 525 of some embodiments consider the number of the complete transactions that the input tables 525 have. In some such embodiments, when the input tables 525 has more than a threshold number of complete transactions, the physical controller aggregates the input changes that make up the complete transactions to generate a single set of transactional output changes.

At the fourth stage 504, the physical controller 505 has determined that the physical controller 505 should use more transactions to generate a single set of transactional output changes. Thus, the physical controller 505 has not sent out the output changes computed from the changes 1-3. The rules engine 520 has performed table mapping operations on the changes 4 and 5 to generate the output changes. The output changes generated from the changes 4 and 5 are then grouped together with the output changes generated from the changes 1-3 as shown. The physical controller 535 will subsequently send this group of output changes to a set of managed forwarding elements or a set of chassis controllers.

The single set of transactional output changes makes up a transaction sent to another controller or a managed forwarding element. A transaction includes a set of changes to be applied to the forwarding state of a receiving managed forwarding element. Therefore, by aggregating several transactions on the input side to generate a single transaction to send out on the output side, the controller of some embodiments combines sets of changes so that all those changes are applied to the managed forwarding element together.

Figure 6:
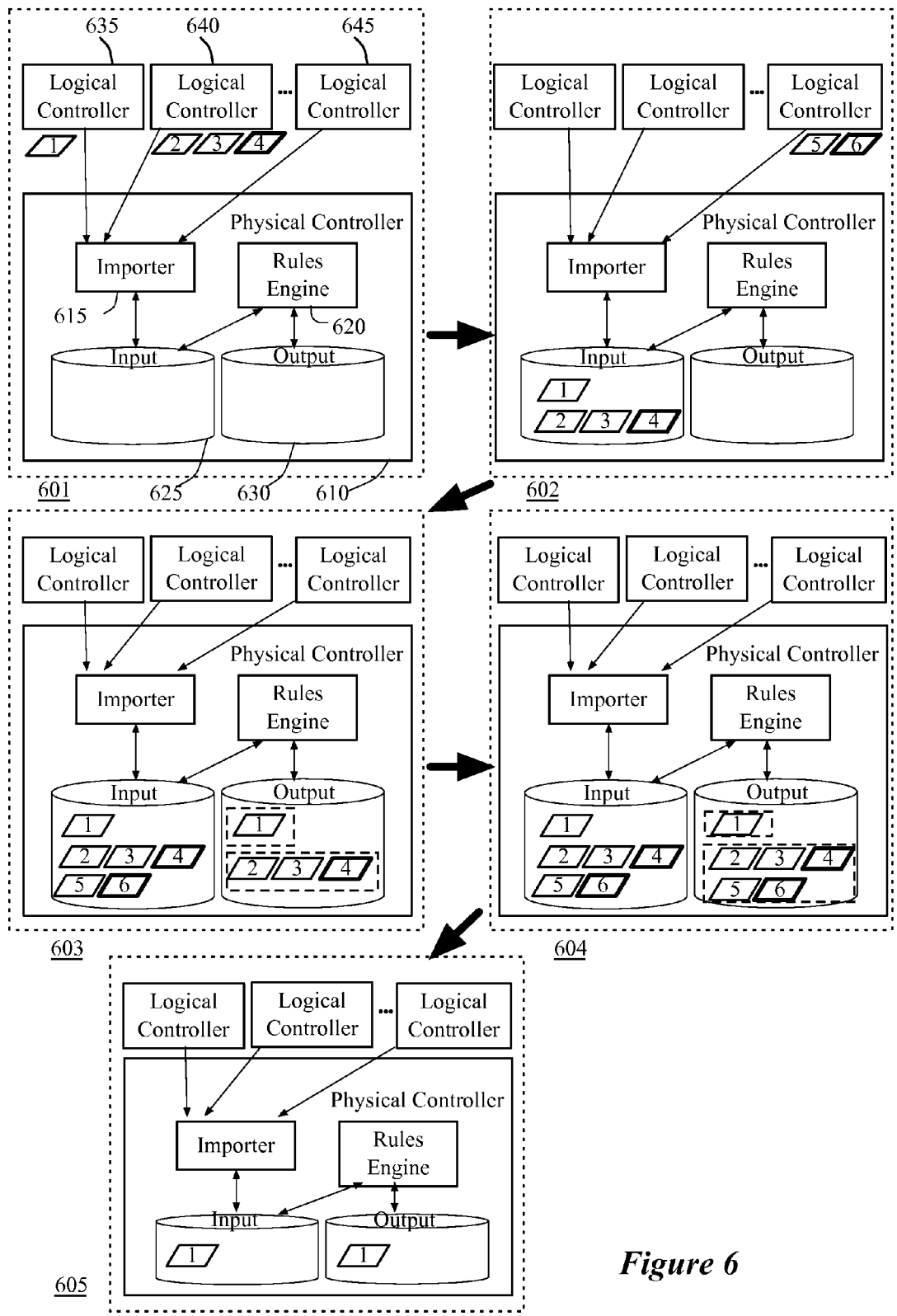
FIG. 6 conceptually illustrates a physical controller that receives input changes from several logical controllers.

FIG. 6 conceptually illustrates a physical controller 610 that receives input changes from several logical controllers 635-645. In particular, this figure illustrates in five stages 601-605 that physical controller 610 aggregates input changes that make up several transactions from several different logical controllers into a single set of transactional output changes. The physical controller 610 is similar to the network controller 200 described above by reference to FIG. 2 in that the physical controller 610 includes an importer 615, a rules engine 620, input tables 625, and output tables 630, which are similar to their corresponding components of the controller 200. For simplicity of discussion, not all components of the physical controller 610 are shown in FIG. 6.

At the first stage 601, the logical controller 635 is sending input change 1 to the physical controller 610. The logical controller 640 is sending input changes 2-4, which make up a complete transaction. At the stage 601, the input tables 625 and the output tables 630 are empty because the physical controller 610 has previously computed and sent out a set of transactional output changes.

At the second stage 602, the physical controller 610 has received the changes 1-4 from the logical controllers 635 and 640. The importer 615 has updated the input tables 625 with the changes 1-4. The second stage 602 also shows that the logical controller is sending changes 5 and 6, which make up a complete transaction.

At the third stage 603, the physical controller 610 has received the input changes 5 and 6 that make up a transaction from the logical controller 645. The importer 615 updates the input tables 625 with the changes 5 and 6. The input tables 625 now has changes 1-6. The third stage 603 also shows that the rules engine 620 has performed table mapping operations to generate output changes from the changes 1-4 that were put into the input tables 625 at the previous stage 602. Two sets of output changes have been generated. As shown, the first set includes the output changes generated from processing the change 1. The second set includes the output changes generated from processing the changes 2-4.

Also at the stage 603, the physical controller 610 determines whether (1) to send out the output changes generated from processing the changes 2-4 because the physical controller has generated these output changes by processing all the input changes that make up a complete transaction or (2) to wait for more input changes to come in. In some embodiments, the physical controller makes this determination based on certain criteria—namely, a period of time elapsed since sending out a set of transactional output changes or receiving a complete transaction, an amount of data in the input tables 625, and/or a number of complete transactions in the input tables 625 as described above by reference to FIG. 5.

At the fourth stage 604, the physical controller 610 has determined that the physical controller 610 should use more transactions to generate a single set of transactional output changes. Thus, the physical controller 610 has not sent out the output changes computed from the input changes 2-4. The rules engine 620 has performed table mapping operations on the changes 5 and 6 and generated the corresponding output changes. However, the output changes computed from the input changes 5 and 6 are now grouped together with the output changes computed from the input changes 2-4 as shown. Thus, the physical controller 610 has generated this single set of output changes from aggregating output from processing two sets of input changes 2-4 and 5-6 that make up two transactions.

At the fifth stage 605, the physical controller 610 has sent out the output changes computed from the changes 2-6 to a set of chassis controllers or a set of managed forwarding elements. The physical controller has removed from the output tables 630 the output changes that have been sent out. The physical controller has also removed the input changes 2-6 from the input tables 625. The stage 605 shows that the input change 1 and the output change computed from the input change 1 remain in the input tables 625 and the output tables 630, respectively. This is because the input change 1 does not make up a complete transaction—the physical controller has not received a barrier that indicates that a complete transaction that includes the change 1 has been received at the physical controller 610.

Figure 7:
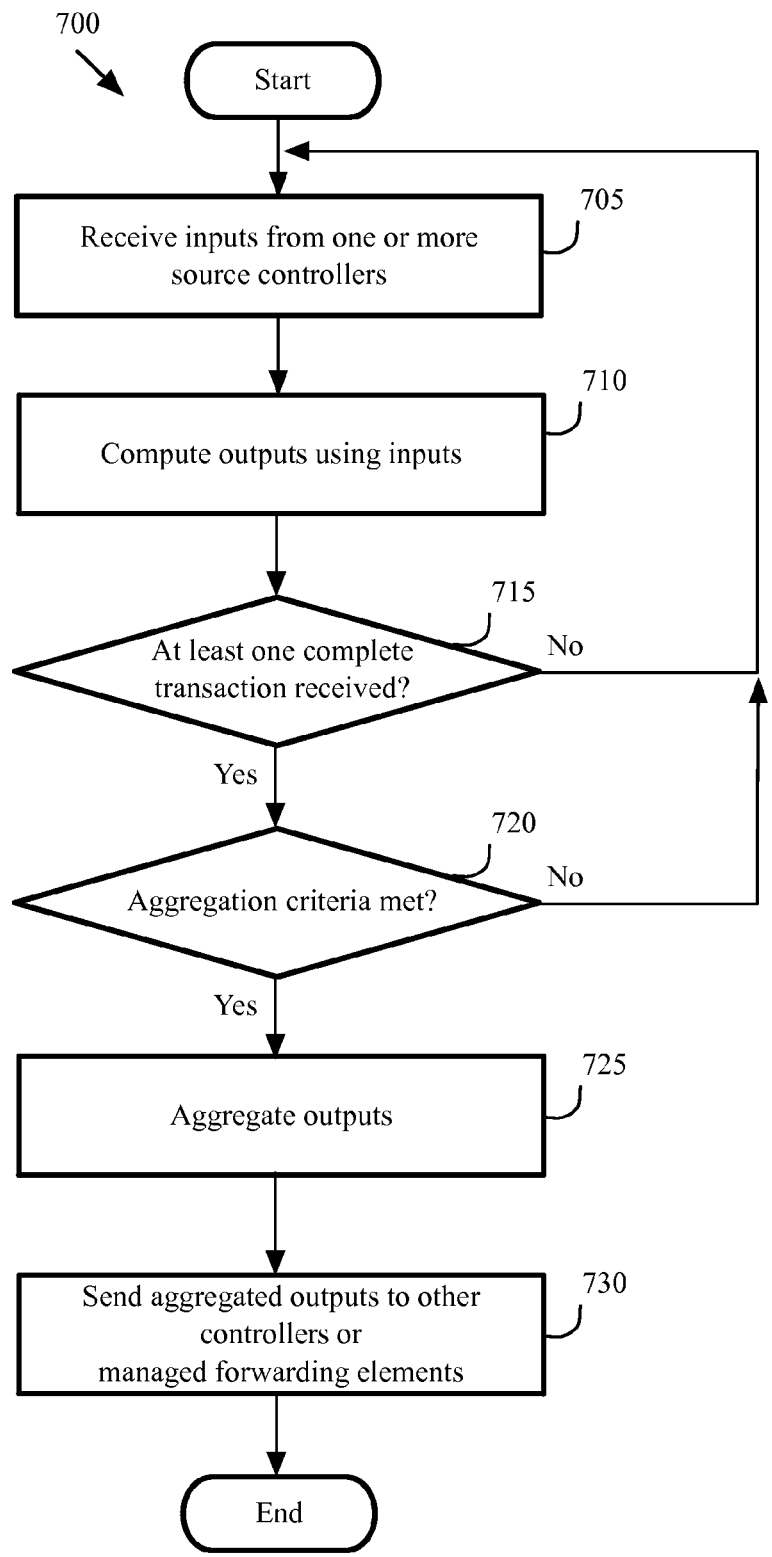
FIG. 7 conceptually illustrates a process that some embodiments perform to generate a set of transactional output changes from the input changes that make up several transactions.

FIG. 7 conceptually illustrates a process 700 that some embodiments perform to generate a set of transactional output changes from input changes that make up several transactions. The process 700 is performed by a receiving controller that receives input changes from two or more source controllers that generate the input changes. In some embodiments, the receiving controller is a physical controller that receives input changes from a set of logical controllers that generate the input changes including UPCP data. Also, the receiving controller can be a chassis controller that receives input changes from a set of physical controllers that relay UPCP data. The receiving controller is similar to the physical controllers 505 and 605 of FIGS. 5 and 6.

The process 700 begins by receiving (at 705) input changes from the source controllers. In some embodiments, input changes from different source controllers are related to different sets of logical forwarding elements. The process 700 then computes (at 710) output changes using the input changes that the process has received so far.

Next, the process 700 determines (at 715) whether the process 700 has received at least one complete transaction from the source controllers. As mentioned above, a complete transaction includes the input changes received from one source controller after receiving a barrier from that source controller and before receiving another barrier. When the process 700 determines (at 715) that the process has not received at least one complete transaction, the process 700 loops back to 705 to receive more input changes from the source controllers.

When the process 700 determines (at 715) that the process has received at least one complete transaction, the process 700 proceeds to 720 to determine whether certain aggregation criteria are met. Different embodiments have different aggregation criteria. For instance, in some embodiments, the certain criteria includes a period of time that has elapsed since sending out the last set of output changes or since receiving the last complete transaction. The certain criteria are met when the period of time has elapsed. Alternatively or conjunctively, in some embodiments, the certain aggregation criteria include an amount of data in the input tables (of the receiving controller that performs the process 700) have. In these embodiments, the certain criteria are met when the input tables have more than a threshold amount of data. In some of these embodiments, instead of or in conjunction the amount of data, the certain criteria include a number of complete transactions that the input tables have. In these embodiments, the certain criteria are met when the input tables have more than a threshold number of complete transactions.

Next, the process 700 aggregates (at 725) the output changes computed from the input changes that make up all of the complete transactions. In some embodiments, the process 700 leaves out those output changes that are computed from the input changes that do not make up a complete transaction. In other words, these left out output changes are computed from the input changes for which a barrier has not been received.

The process 700 then sends (at 730) the aggregated output changes to a set of controllers that are in a layer below in the hierarchy of the controllers or to a set of managed forwarding elements that forwards data based on the output changes. The process 700 of some embodiments inserts a barrier at the end of the output changes or adds information to indicate a complete transaction to the last change of the output changes. Also, the process removes the sent-out output changes from the output tables of the receiving controller and removes the input changes that make up the complete transactions, from which the sent-out output changes were computed, from the input tables of the receiving controller. The process then ends.

C. Example Use Cases

1. API

The inputs defining logical forwarding elements in the form of application programming interface (API) calls are sent to an input translation controller supporting the API.

The network control system of some embodiments renders the API updates atomically. That is, a configuration change migrates the system from the old state to the new state in an atomic manner. Specifically, after receiving an API call, the API receiving code in the system updates the state for an nLog engine and after feeding all the updates in, the API receiving code in the system waits for a fixed point (to let the computation converge) and signals the transaction to be ended by committing the changes for the nLog. After this, the forwarding state updates will be sent downwards to the controllers below in the cluster hierarchy, or towards the forwarding elements—all in a single transactional update. The update will be applied in a transactional manner by the receiving element.

In some embodiments, the API update can be transmitted across a distributed storage system (e.g., the PTDs in the controllers) as long as the updates arrive as a single transactional update to the receiver. That is, as long as the update is written to the storage as a single transactional update and the nLog processing controller receives the update as a single transaction, it can write the update to the nLog computation process as a single transactional update, as the process for pushing the state updates continues as described above.

2. Controller Failover

Consider a master logical controller that manages a set of logical forwarding elements. In some embodiments, the controller has a hot backup computing the same state and pushing that state downwards in a similar manner as the master. One difference between the master and the hot backup is that the stream from the backup is ignored until the failover begins. As the master dies, the receiving controller/forwarding element can switch over to the backup by gradually migrating from the old state to the new state as follows.

Instead of the removing/shutting down the stream of state updates from the old master and letting the computation converge towards a state where there is now an active stream of updates coming from the controllers above, it merely turns on the new master, lets the computation converge, and effectively merges the old and new stream. That is, this is building on the assumption that both sources produce identical or almost identical streams. After doing this, the controller waits for the computation to converge, by waiting for the fixed point and only after it has reached the fixed point, it removes the old stream completely. Again, by waiting for the fixed point, the controller lets the computation converge towards the use of the new source only. After this, the controller can finalize the migration from the old source to the new source by committing the transaction. This signals the nLog runtime to effectively pass the barrier from the controllers/forwarding elements below as a signal that the state updates should be processed.

D. On-Demand Request Processing

In some cases, the API request processing may be implemented using the nLog engine. In that case, the request is fed into the nLog engine by translating the request to a set of tuples that will trigger the nLog computation of the API response, again represented as a tuple. When the tuple request and response have a one-to-one mapping with request and response tuples, waiting for the response is easy: the API request processing simply waits for a response that matches with the request to arrive. Once the response that matches with the request arrives, the computation for the response is ready.

However, when the request/response do not have a one-to-one mapping, it is more difficult to know when the request processing is complete. In that case, the API request processing may ask for the fixed point of the computation after feeding the request in; once the fixed point is reached, the request has all the responses produced. As long as the request and response tuples have some common identifier, it is easy to identify the response tuples, regardless of the number of the response tuples. Thus, this use case does not require the use of commits as such, but the enabling primitive is the fixed point waiting.

Figure 8:
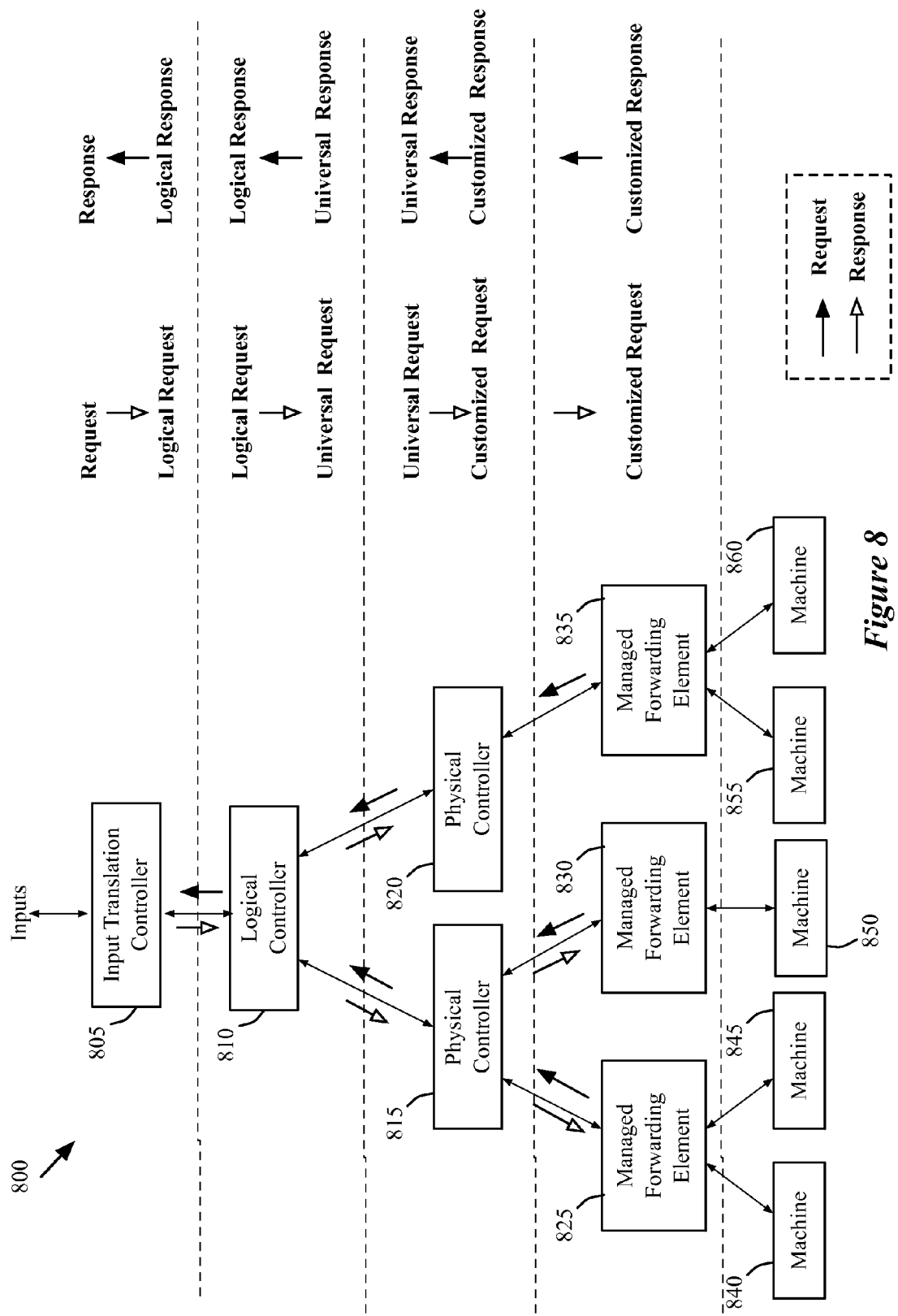
FIG. 8 illustrates a network control system in which network controllers distribute a request from the user to the managed forwarding elements and return a response to the request back to the user.

FIG. 8 illustrates a network control system 800 in which network controllers distribute a request from the user to the managed forwarding elements and return a response to the request back to the user. The network control system 800 is similar to the network control system 100 of FIG. 1 in that the controllers in the network control system 800 also compute forwarding state information to push to the managed forwarding elements in order to define forwarding behaviors of the managed forwarding elements. The network control system 800 includes an input translation controller 805, a logical controller 810, two physical controllers 815 and 820, and three managed forwarding elements 825-835. The network control system 800 represents a simplified example, with two physical controllers 815 and 820 distribute the request to three managed forwarding elements. In many cases, the network control system of some embodiments would include numerous controllers and hundreds or thousands of managed forwarding elements.

The input translation controller 805 of some embodiments takes inputs from the user. These inputs include specification of the logical network, which the input translation controller translates into the LCP data that the logical controllers will subsequently process. Moreover, the inputs may also include requests for information about the logical network. For instance, a request from the user may ask for statistical information (e.g., traffic volume for the logical ports of a logical forwarding element for a certain period of time). The input translation controller 805 translates the request into a logical request in the form of data tuples that the logical controllers will subsequently process.

In some embodiments, the input translation controller 805 receives the inputs from the user in the form of API calls. The input translation controller 805 supports the API and a network management application (e.g., a web application or a command line interface (CLI) application) can be built on top of the API. The user uses the network application to get the inputs to the input translation controller.

In some embodiments, the network controllers 810-820 perform conversion of the request and distribute the request down to the managed forwarding elements in the form of data tuples. The network controllers of some embodiments perform several distinct conversions of the request before distributing the request to the managed forwarding elements. Specifically, the logical controller 810 receives the logical request from the input translation controller 805. In some embodiments, a logical request is specified in terms of logical attributes of a logical network. An example logical request would be a request for information about a particular logical port of a particular logical forwarding element. This request would be written in terms of the logical port name or address and the logical forwarding element's name or address.

The logical controller 810 converts this logical request into a universal request. In some embodiments, a universal request is specified in terms of attributes of the managed forwarding elements that implement the logical network.

However, these attributes are expressed in abstract terminologies that are not specific to a particular physical implementation (e.g., port numbers, tunnel identifiers, etc.). For instance, a universal request could be written using a name of a physical port of any of the managed forwarding elements instead of using actual port numbers for the physical ports.

The logical controller 810 sends this universal request to any number of physical controllers in some embodiments. For instance, the logical controller 810 sends the universal request to two physical controllers 815 and 820. In some embodiments, the universal request bears an identifier for identifying the request. This identifier will be used to match up the request to the corresponding responses. The responses will be described further below.

Each managed forwarding element is managed by a master physical controller. Thus, a logical request for a logical forwarding element implemented across several managed forwarding elements may be sent to the several different master physical controllers that managed these forwarding elements. As shown, the physical controller 815 is the master controller that manages two managed forwarding elements 825 and 830. The physical controller 820 is the master controller that manages the managed forwarding element 835.

At either the physical controller, or a chassis controller (not shown in this figure) in the same physical machine as the managed forwarding element, the universal request is converted to a customized request. In some embodiments, a customized request is specified in terms of attributes of the managed forwarding element that are specific to the managed forwarding element. For instance, a customized request for a managed forwarding element could be written in actual, locally used port numbers for the physical ports of the managed forwarding elements. In those embodiments where the physical controller is a pass-through to send UPCP data to the chassis controller, the physical controller is a pass-through to send the universal request to the chassis controller.

The managed forwarding elements 825-835 are similar to the managed forwarding elements 125-135 of FIG. 1. The end machines 840-860 are similar to the end machines 140-160 of FIG. 1. The managed forwarding element 825-835 gather the information about which the customized requests inquire. The managed forwarding elements 825-835 each generates a customized request that includes the gathered information in response to receiving the customized request.

The managed forwarding elements pass up the customized responses to the physical controllers (or chassis controllers) from which the managed forwarding elements received the customized requests. At either the physical controllers, or the chassis controllers, the customized responses are aggregated if necessary and then converted into the universal response. The universal responses are then passed up to the logical controller from which the physical controllers received the universal request.

For instance, the physical controller 815 receives the customized requests from the managed forwarding elements 825 and 830, aggregates the customized requests, and converts it into a universal response. The physical controller 820 does not have to aggregate customized responses in some embodiments. The physical controller 820 just converts the customized response received from the managed forwarding element 825 and passes up the universal response to the logical controller 810.

The logical controller 810 receives the universal responses from the physical controllers to which the logical controller 810 sent the universal request. The logical controller 810 aggregates the universal responses, convert the aggregated universal response into a logical response, and then pass up the logical response to the input translation controller 805. The input translation controller 805 then translates the logical response into outputs for the user to view through the management application in some embodiments.

In some embodiments, the customized responses, the universal responses, and the logical response are specified in the same attributes that were used to specify the customized requests, the universal request, and the logical request, respectively. These requests and responses are in the form of data tuples in some embodiments.

It is to be noted that a controller in the hierarchy of controllers does not receive multiple responses from the controllers below in the hierarchy in some cases. For instance, when the request is for getting information of a particular logical port that is mapped to a particular physical port of a particular managed forwarding element, the logical controller does not have to distribute a universal request to more than one physical controller and therefore the logical controller would get one universal response from the physical controller.

Figure 9:
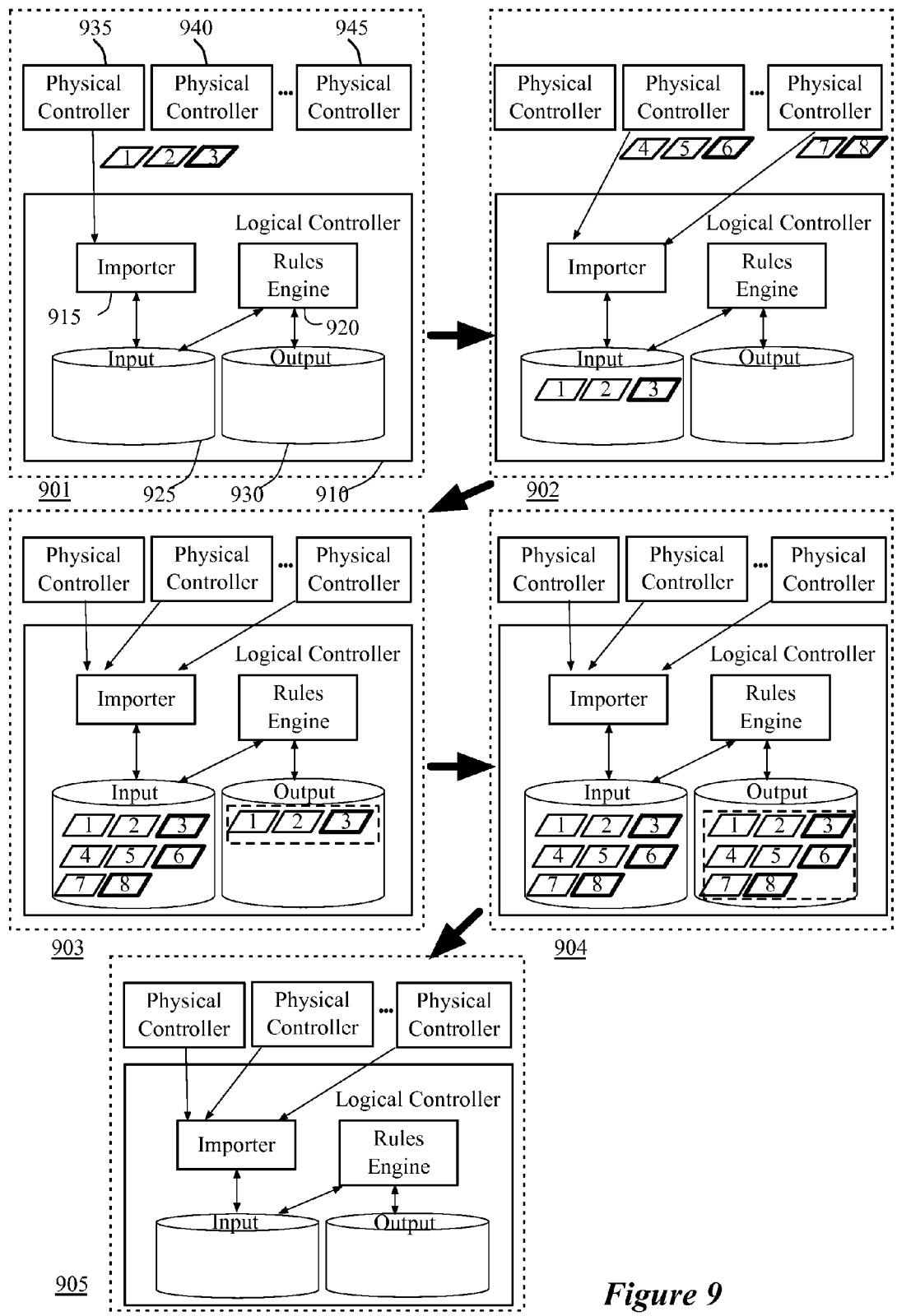
FIG. 9 illustrates a logical controller of some embodiments that aggregates universal responses received from a set of physical controllers.

When a controller passes up a response to another controller above in the hierarchy of controllers that sent a request to the controller, the controller sends the response in a transactional manner. FIG. 9 illustrates a logical controller 910 of some embodiments that aggregates universal responses received from a set of physical controllers 935, 940, and 945. In particular, this figure illustrates in five stages 901-905 that logical controller 910 aggregates output changes from processing input changes that make up several transactions from several different physical controllers into a single set of transactional output changes. The logical controller 910 then passes up the aggregated output changes to an input translation controller (not shown). The aggregated output changes include a logical response that contains the information inquired about by a logical request that the logical controller 905 had received from the input translation controller.

The logical controller 910 is similar to the network controller 200 described above by reference to FIG. 2 in that the logical controller 910 includes an importer 915, a rules engine 920, input tables 925, and output tables 930, which are similar to their corresponding components of the controller 200. For simplicity of discussion, not all components of the logical controller 910 are shown in FIG. 9.

At the first stage 901, the physical controller 935 is sending input changes 1-3 to the logical controller 910. The input changes 1-3 includes a universal response that is prepared by the physical controller 935 in response to receiving a universal request from the logical controller 910. In some embodiments, the input changes 1-3 include an identifier of the universal request. The logical controller 910 uses the identifiers to match up the responses to the request.

In some embodiments, the physical controller 935 prepares the universal response by (1) aggregating a set of customized responses that the physical controller 935 receives from a set of managed forwarding elements and (2) converting the aggregated customized responses into the universal response. In other embodiments, the physical controller 935 prepares the universal response by aggregating a set of universal responses that the physical controller 935 receives from a set of chassis controllers (not shown).

The chassis controllers prepares the universal responses to pass up to the physical controller 935 by aggregating a set of customized responses from a set of managed forwarding element instances operating in the same hosts in which the chassis controllers operates.

At the stage 901, the input tables 925 and the output tables 930 may contain records for forwarding state, requests, and/or responses. These other records are not depicted in this figure for simplicity of discussion.

At the second stage 902, the logical controller 910 has received the changes 1-3 from the physical controller 935. The importer 915 has updated the input tables 925 with the changes 1-3. The second stage 902 also shows that the physical controller 940 is sending changes 4-6, which make up a complete transaction. The controller 945 is sending changes 7 and 8, which make up a complete transaction. The changes 4-6 and the changes 7-8 include universal responses that the physical controller 935 and 940 prepared, respectively, in response to receiving a universal request from the logical controller 910. In some embodiments, the changes 4-8 also include the identifier of the universal request.

At the third stage 903, the logical controller 910 has received the set of transactional input changes 4-6 from the physical controller 940 and the input changes 7 and 8 that make up a transaction from the physical controller 945. The importer 915 updates the input tables 925 with the changes 4-8. The input tables 925 now has changes 1-8. The third stage 903 also shows that the rules engine 920 has performed table mapping operations to generate output changes from the changes 1-3 that were put into the input tables 925 at the previous stage 902.

Also at the stage 903, the logical controller 910 determines whether (1) to send out the output changes generated from processing the changes 1-3 because the logical controller 910 has generated these output changes by processing the input changes that make up a complete transaction or (2) to wait for more input changes that contain universal responses to come in. The physical controller makes this determination based on certain criteria. For instance, in some embodiments, the logical controller 910 waits for all of the physical controllers that received a universal request from the logical controller 910 to pass up universal responses. In these embodiments, the logical controller 910 aggregates the output changes generated from processing all the universal responses to generate a logical response. Alternatively or conjunctively, the physical controller 505 aggregates output changes generated from processing universal responses that have been received during a predetermined period of time after the universal request is sent down to the physical controllers. The physical controllers generate a logical response from the output changes aggregated during the predetermined period of time.

At the fourth stage 904, the logical controller 910 has determined that the logical controller 910 should use more transactions that contain universal responses to generate a single set of transactional output changes that contain a logical response. Thus, the logical controller 910 has not sent out the output changes computed from the input changes 1-3 that were computed at the previous stage 903. The rules engine 920 has performed table mapping operations on the changes 4-8 and generated the corresponding output changes. However, the output changes computed from the input changes 4-8 are now grouped together with the output changes computed from the input changes 1-3 as shown. Thus, the logical controller 910 has generated this single set of output changes that contain a logical response from aggregating the input changes 1-3, 4-6, and 7-8 that make up three complete transactions.

At the fifth stage 905, the logical controller 910 has sent out the output changes computed from the changes 1-8 to the input translation controller (not shown). The physical controller has removed the input changes 1-8 from the input tables 925 and the output changes from the output tables 930.

FIG. 9 illustrates aggregation of universal responses by a logical controller. One of ordinary skill in the art will recognize that the logical controller and the physical controllers illustrated in FIG. 9 can be replaced with a physical controller and chassis controllers, respectively, in order to illustrate aggregation of customized responses by the physical controller.

Figure 10:
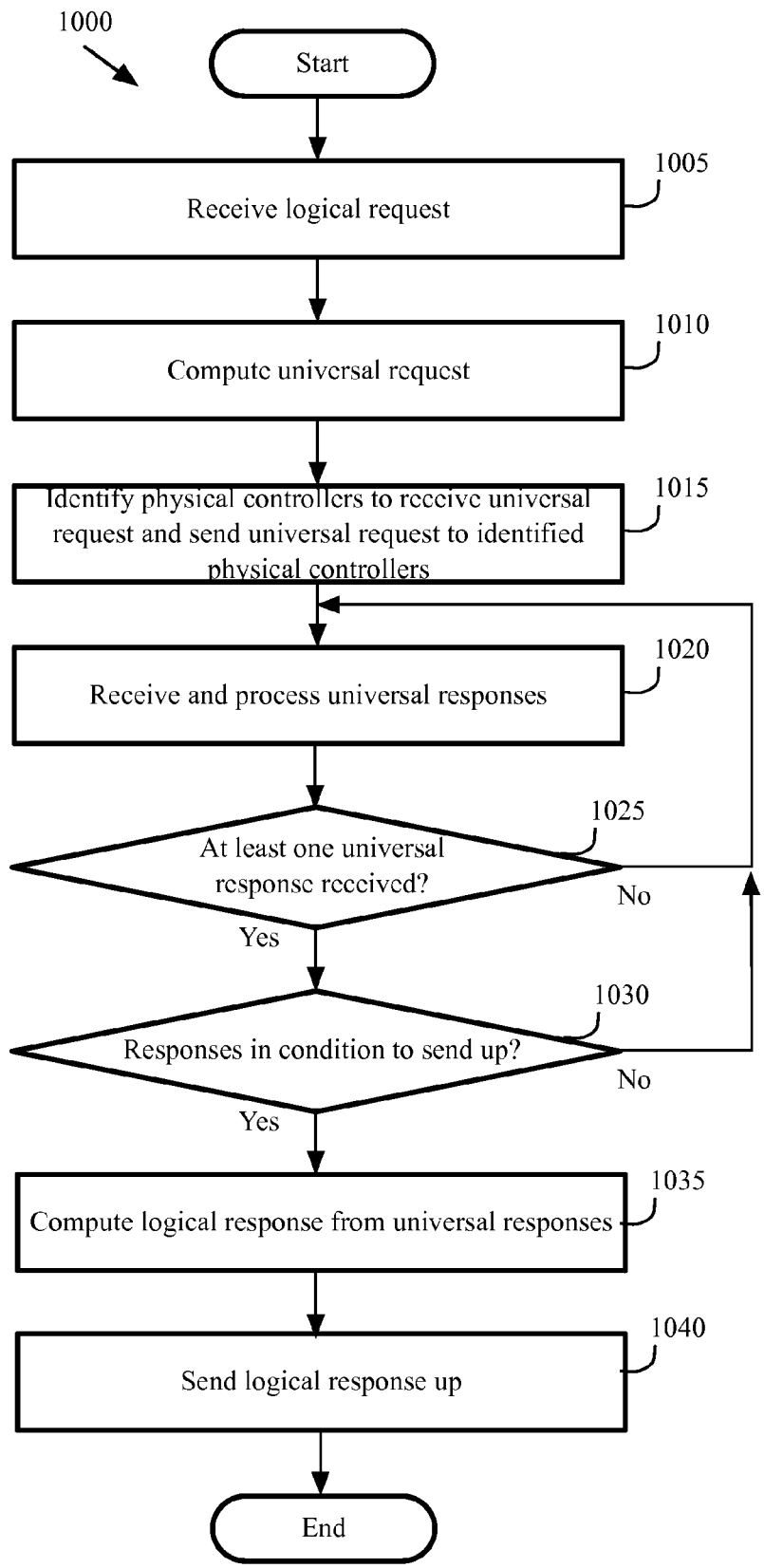
FIG. 10 conceptually illustrates a process that some embodiments perform to aggregate a set of responses from lower controllers in a layer below in a hierarchy of controllers to generate a single response to pass up to an upper controller in a layer above in the hierarchy.

FIG. 10 conceptually illustrates a process 1000 that some embodiments perform to aggregate a set of responses from a set of lower controllers in a layer below in a hierarchy of controllers to generate a single response to pass up to an upper controller in a layer above in the hierarchy. In some embodiments, the process 1000 is performed by a middle controller that is similar to the logical controllers 810 and 910 of FIGS. 8 and 9. That is, the middle controller (1) receives a request from the upper controller, (2) distributes the request to the set of lower controllers, and (3) aggregates responses to the request from the lower controllers to generate and pass up a single response to the upper controller. In some embodiments, the requests and responses that the middle controller receives or generates are in the form of changes (e.g., data tuples) that make up complete transactions.

In some embodiments, the receiving controller is a logical controller that receives logical requests from a input translation controller; sends out universal requests to a set of physical controllers; receives universal responses from the physical controllers; and sends out a logical response to the input translation controller. Below the process 1000 is described as being performed by the logical controller. However, the receiving controller of some embodiments can be a physical controller that receives universal requests from a logical controller; sends out customized requests to a set of managed forwarding elements or relays out the universal requests to a set of chassis controllers; receives customized responses from the managed forwarding elements or receives universal responses from the chassis controllers; and sends out a universal response to the logical controller.

The process 1000 begins by receiving (at 1005) a logical request from an input translation controller. The input translation controller generates the logical request from input data provided by a user of the network control system of some embodiments. The logical request inquires about certain information of a logical forwarding element that the user manages through the input translation controller. The process 1000 then computes (at 1010) a universal request by converting the logical request to the universal request.

Next, the process 1000 identifies (at 1015) a set of physical controllers to which to send the universal request. In order to identify the set of physical controllers, the process 1000 first identifies a set of managed forwarding elements that implement the logical forwarding element and then identifies the master physical controllers of the set of managed forwarding elements. These master physical controllers should receive the universal request in some embodiments. The process 1000 sends (at 1015) the universal request to each of the identified physical controllers. In some embodiments, the process 1000 maintains an identifier of the logical request and adds the identifier to the universal request. The process 1000 uses to match up the universal responses to the universal request and to the logical request.

Having sent the universal request to the identified set of physical controllers, the process 1000 receives (at 1020) universal responses from the physical controllers. Also at 1020, the process 1000 processes (e.g., performs table mapping operations on) the input changes that contain the universal responses to generate output changes.

Next, the process 1000 determines (at 1025) whether the process 1000 has received at least one complete transaction from the physical controllers. A complete transaction includes the input changes received from a physical controller after receiving a barrier from that physical controller and before receiving another barrier. A complete transaction from a physical controller includes a universal response.

When the process 1000 determines (at 1025) that the process has not received at least one complete transaction (e.g., at least one complete universal response) from the physical controllers, the process 1000 loops back to 1020 to receive more input changes from the physical controllers.

When the process 1000 determines (at 1025) that the process has received at least one complete transaction, the process 1000 proceeds to 1030 to determine whether certain aggregation criteria are met. Different embodiments have different aggregation criteria. For instance, in some embodiments, the certain criteria include a period of time that has elapsed since sending out (at 1015) the universal requests or since receiving (at 1005) the logical request. The certain criteria are met when the period of time has elapsed. Alternatively or conjunctively, in some embodiments, the certain criteria include whether universal responses are received from all of the physical controllers that received the universal requests. In these embodiments, the certain criteria are met when universal responses are received from all of the physical controllers that received the universal requests.

When the process 1000 determines (at 1030) that the certain criteria are not met, the process loops back to 1020 to continue receiving universal responses and process the universal responses. When the process 1000 determines (at 1030) that the certain criteria are met, the process 1000 aggregates (at 1035) the output changes computed from the universal responses received (i.e., the input changes of the complete transactions that contain the universal responses). Also at 1035, the process 1000 generates a single logical response from the aggregated output changes.

The process 1000 then sends (at 1040) the logical response to the input translation controller that had sent the logical request to the logical controller. The process 1000 of some embodiments inserts a barrier at the end of the output changes or adds information to indicate a complete transaction to the last change of the output changes. Also, the process removes the sent-out output changes from the output tables of the logical controller and removes the input changes that make up the complete transactions, from which the logical response was computed, from the input tables of the logical controller. The process then ends.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
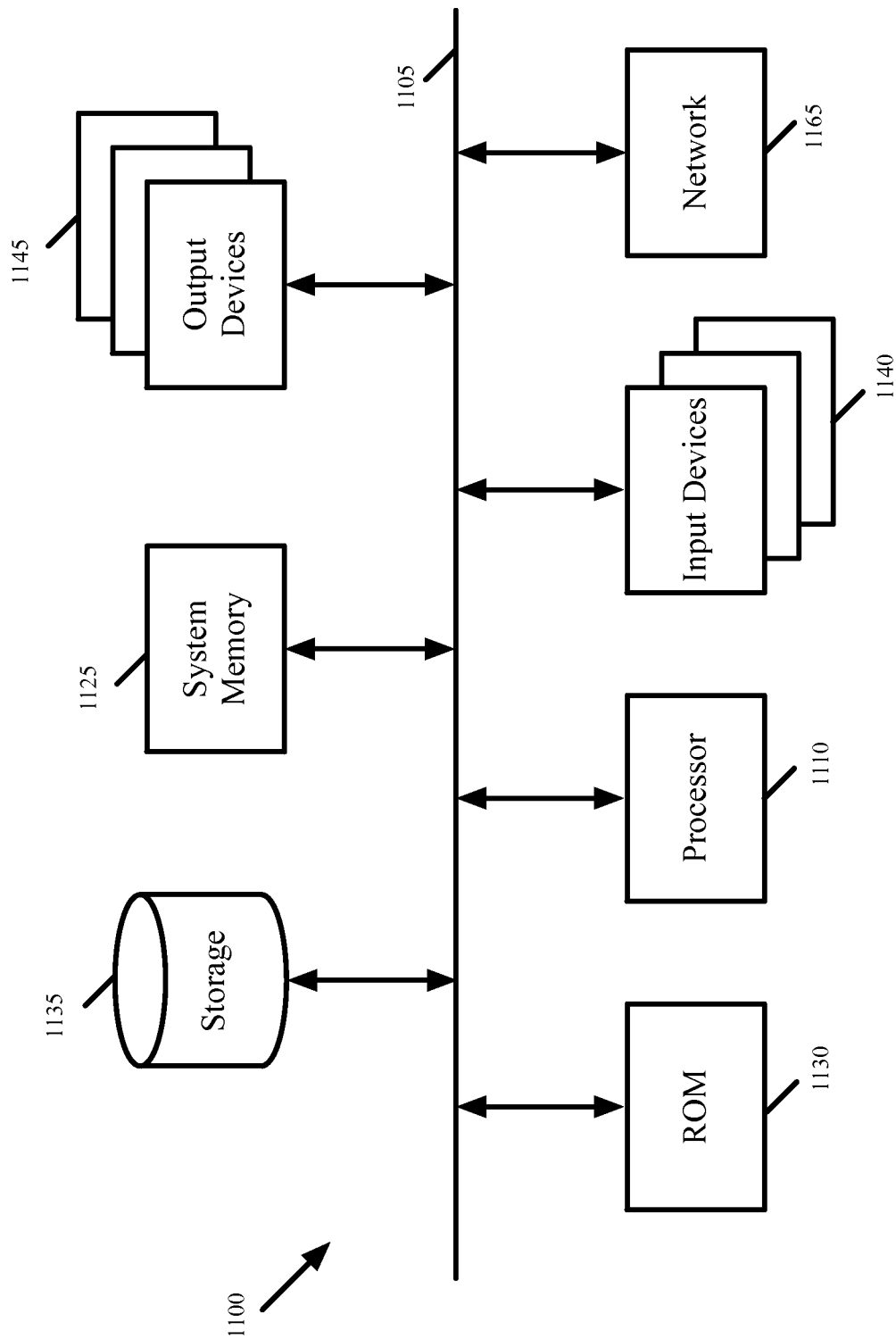
FIG. 11 conceptually illustrates an electronic system with which some embodiments of the invention are implemented.

FIG. 11 conceptually illustrates an electronic system 1100 with which some embodiments of the invention are implemented. The electronic system 1100 can be used to execute any of the control, virtualization, or operating system applications described above. The electronic system 1100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1125, and the permanent storage device 1135.

From these various memory units, the processing unit(s) 1110 retrieve instructions to execute and data to process in order to execute the processes of the invention. The processing unit(s) may be a single processor or a multi-core processor in different embodiments.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1125 is a read-and-write memory device. However, unlike storage device 1135, the system memory is a volatile read-and-write memory, such a random access memory. The system memory stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices enable the user to communicate information and select commands to the electronic system. The input devices 1140 include alphanumeric keyboards and pointing devices (also called "cursor control devices"). The output devices 1145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples electronic system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4, 7, and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. For a particular controller for managing a network by generating configuration data for a plurality of managed forwarding elements that forward data to each other in the network, a method for computing sets of managed forwarding element configuration outputs using corresponding sets of configuration inputs from first and second controllers, the method comprising:

receiving a first set of inputs that are part of a particular transaction relating to a logical forwarding element that is implemented by the plurality of managed forwarding elements from the first controller and a second set of inputs that are redundant of the first set of inputs and are part of the particular transaction relating to the logical forwarding element from the second controller, wherein the inputs of the particular transaction are (i) for processing together to compute a set of managed forwarding element configuration output changes and (ii) for processing separately from other, separate transactions processed by the particular controller that relate to other logical forwarding elements;

storing the second set of inputs while computing a first portion of the set of managed forwarding element configuration output changes using the first set of inputs;

after a failure of the first controller, receiving a third set of inputs from the second controller, the third set of inputs comprising inputs that are part of the particular transaction relating to the logical forwarding element and are not in the second set of inputs;

while maintaining the first portion of the set of managed forwarding element configuration output changes, computing a second portion of the set of managed forwarding element configuration output changes using the second and third sets of inputs; and after computing the complete set of managed forwarding element configuration output changes, outputting the set of managed forwarding element configuration output changes for distribution to a set of managed forwarding elements.

2. The method of claim 1, wherein at least one input in the second set of inputs is duplicative of an input in the first set of inputs, wherein computing the second portion of the set of managed forwarding element configuration output changes comprises computing the second portion of the set of managed forwarding element configuration output changes such that the duplicative input does not affect the first portion of the set of managed forwarding element configuration output changes.

3. The method of claim 1 further comprising receiving an indicator from the second controller, the indicator indicating that the last input in the third set of inputs of the particular transaction has been sent by the second controller and thereby indicating that all inputs of the particular transaction have been received at the controller, wherein the indicator is part of an input in the third set of inputs.

4. The method of claim 1, wherein the inputs of the first, second and third sets of inputs are data tuples.

5. The method of claim 1, wherein the managed forwarding element configuration output changes define forwarding behaviors of the managed forwarding elements.

6. A non-transitory machine readable medium of a controller computer storing a program for a recipient network controller which when executed by a set of processing units computes forwarding state configuration data for a set of managed forwarding elements using inputs from a set of source controllers, the program comprising sets of instructions for:
- receiving, from the set of source controllers, a plurality of groups of inputs that define a set of logical forwarding elements, each group of inputs for being processed together by the recipient network controller and separately from the processing of other groups of inputs, wherein the processing of each group of inputs by the recipient network controller generates a corresponding set of managed forwarding element configuration outputs used by a set of managed forwarding elements to implement the set of logical forwarding elements;
- generating sets of managed forwarding element configuration outputs corresponding to each group of received inputs;
- when at least two of the groups of inputs meet a certain condition, sending the corresponding sets of outputs to the set of managed forwarding elements as a single transaction to configure the managed forwarding elements to implement the set of logical forwarding elements; and
- when no combination of the groups of inputs meets the certain condition, sending the corresponding sets of outputs to the set of managed forwarding elements as separate transactions to configure the managed forwarding elements to implement the set of logical forwarding elements.

7. The non-transitory machine readable medium of claim 6, wherein the certain condition comprises a number of groups of inputs stored in a storage structure.

8. The non-transitory machine readable medium of claim 6, wherein the certain condition comprises the at least two groups of inputs having a specific amount of data.

9. The non-transitory machine readable medium of claim 6, wherein the certain condition comprises an amount of time elapsed after previously sending outputs to the set of managed forwarding elements.

10. The non-transitory machine readable medium of claim 6, wherein the set of managed forwarding elements that receives the sets of outputs treats the sets of outputs as a group of inputs for being processed together and separately from other groups of inputs.

11. A non-transitory machine readable medium for storing a first controller program which when executed by at least one processing unit manages a network comprising a plurality of managed forwarding elements that forward data in the network, the first controller comprising sets of instructions for:
- for a first request for information about a logical forwarding element that logically connects a set of end machines, identifying a set of second controllers that manage forwarding behaviors of a set of managed forwarding elements that implement the logical forwarding element;
- generating a set of second requests for information about the set of managed forwarding elements based on the first request;
- distributing the set of second requests to the set of second controllers;
- receiving, from each controller of the set of second controllers, a response to the second request of the set of second requests sent to the second controller, the response including at least a portion of the requested information from the second requests; and
- when the set of responses meets certain criteria, combining the responses received from the set of second controllers to generate a combined response to the first request providing information about the logical forwarding element and sending the combined response to a source of the first request.

12. The non-transitory machine readable medium of claim 11, wherein the set of second requests meets the certain criteria when the set of second requests comprises at least a specified amount of data.

13. The non-transitory machine readable medium of claim 11, wherein the certain criteria comprises an amount of time having elapsed after distributing the set of second requests to the set of second controllers.

14. The non-transitory machine readable medium of claim 11, wherein the first request is expressed in terms of names of logical constructs of the logical forwarding element.

15. The non-transitory machine readable medium of claim 14,
- wherein the set of instructions for generating the set of second requests comprises a set of instructions for translating the first request into a set of universal physical requests that is expressed in terms of universal names of physical constructs of the set of managed forwarding elements,
- wherein the set of instructions for distributing the set of second requests comprises a set of instructions for distributing the set of universal physical requests.

16. The non-transitory machine readable medium of claim 15, wherein the set of second controllers subsequently translate the set of universal physical requests into customized physical requests which are expressed in terms of customized names of the physical constructs of the set of managed forwarding elements.

17. The non-transitory machine readable medium of claim 16, wherein each universal physical request comprises a set of data tuples.

18. For a first controller for managing a network by generating configuration data for a plurality of managed forwarding elements that forward data in the network, a method for computing forwarding state to send to a second controller, the method comprising:
- receiving a plurality of input data tuples defining a set of logical forwarding elements;
- generating, from the input data tuples, output forwarding state data tuples that define forwarding behaviors of the set of managed forwarding elements to implement the set of logical forwarding elements;
- sending each output data tuple to the second controller as the output tuple is generated; and
- upon determining that a first set of output data tuples for a set of input data tuples has been generated and sent to the second controller, sending an indicator, which indicates an end of the set of output data tuples, to the second controller,
- wherein the second controller generates a second set of output data tuples from the first set of output data tuples by processing the first set of output data tuples separately from other sets of output data tuples received by the second controller, wherein the second controller generates its own indicator for the second set of output data tuples only after receiving the indicator from the first controller.

19. The method of claim 18, wherein the indicator is sent as part of an output data tuple that is the last output data tuple generated of the first set of output data tuples.

20. The method of claim 18, wherein the indicator is also a data tuple.

21. The method of claim 18, wherein when the second controller receives the indicator, all of the output data tuples in the first set of output data tuples are deemed to have arrived at the second controller.

22. The method of claim 18, wherein the indicator also indicates that all input data tuples of the set of input data tuples have been used to generate the first set of output data tuples.

* * * * *